United States Patent
Okazaki

(10) Patent No.: US 10,566,842 B2
(45) Date of Patent: Feb. 18, 2020

(54) POWER FEEDING SYSTEM, POWER RECEIVING DEVICE, AND POWER FEEDING METHOD

(71) Applicant: ABLIC Inc., Chiba-shi, Chiba (JP)

(72) Inventor: Norihiro Okazaki, Chiba (JP)

(73) Assignee: ABLIC INC., Chiba (JP)

( * ) Notice: Subject to any disclaimer, the term of this patent is extended or adjusted under 35 U.S.C. 154(b) by 166 days.

(21) Appl. No.: 15/906,508

(22) Filed: Feb. 27, 2018

(65) Prior Publication Data
US 2018/0254667 A1    Sep. 6, 2018

(30) Foreign Application Priority Data
Mar. 1, 2017  (JP) .................................. 2017-038542

(51) Int. Cl.
*H02J 50/12*    (2016.01)
*H02J 50/60*    (2016.01)
*H02J 7/02*    (2016.01)

(52) U.S. Cl.
CPC .............. *H02J 50/12* (2016.02); *H02J 7/025* (2013.01); *H02J 50/60* (2016.02)

(58) Field of Classification Search
None
See application file for complete search history.

(56) References Cited

U.S. PATENT DOCUMENTS

2015/0091387 A1*  4/2015  Okazaki ................. H02J 5/005
                                                                    307/104
2017/0256989 A1*  9/2017  Yoshii ..................... H02J 50/12

FOREIGN PATENT DOCUMENTS

JP          2015-070689 A          4/2015

* cited by examiner

*Primary Examiner* — Jared Fureman
*Assistant Examiner* — Aqeel H Bukhari
(74) *Attorney, Agent, or Firm* — Brinks Gilson & Lione

(57) ABSTRACT

A power feeding system includes a power feeding device and a power receiving device. The power receiving device includes: a resonant circuit including a receiving coil, a resonant capacitor configured to resonate with the receiving coil, and a resonance control transistor configured to control a resonant state by changing an electrical connection state of the resonant capacitor; a rectifying diode configured to rectify received power by the receiving coil; and a resonance control unit configured to set the resonance control transistor to a non-conductive state based on the received power and power consumption of the load during a period including a subsequent conducting period during which a current flows to the rectifying diode, and which is estimated in a resonant state of the resonant circuit.

14 Claims, 14 Drawing Sheets

POWER FEEDING SYSTEM, POWER RECEIVING DEVICE, AND POWER FEEDING METHOD

RELATED APPLICATIONS

This application claims priority under 35 U.S.C. § 119 to Japanese Patent Application No. 2017-038542 filed on Mar. 1, 2017, the entire content of which is hereby incorporated by reference.

BACKGROUND OF THE INVENTION

1. Field of the Invention

The present invention relates to a power feeding system, a power receiving device, and a power feeding method.

2. Description of the Related Art

In recent years, there has been popularized a power feeding system configured to supply electric power wirelessly through electromagnetic induction or electromagnetic coupling between a feeding coil and a receiving coil. In such a power feeding system, there is a problem of heat generation that occurs when, for example, a metallic foreign object is placed on the feeding coil, and hence there has been known a technology for determining whether or not electric power can be supplied to a power receiving device (see, for example, Japanese Patent Application Laid-open No. 2015-70689).

In the technology described in Japanese Patent Application Laid-open No. 2015-70689, the power receiving device includes a resonance control transistor configured to control a resonant state by changing a connection state of a resonant capacitor configured to resonate with the receiving coil. In the technology described in Japanese Patent Application Laid-open No. 2015-70689, it is determined whether or not electric power can be supplied to the power receiving device by detecting periodic switching between a resonant state and a non-resonant state of the receiving coil caused by the resonance control transistor as a periodic voltage waveform variation of the feeding coil.

However, in the technology described in Japanese Patent Application Laid-open No. 2015-70689, for example, when switching between the resonant state and the non-resonant state occurs for each cycle in the power receiving device during one cycle of drive of the feeding coil, a voltage waveform variation of the feeding coil may not be detected.

SUMMARY OF THE INVENTION

According to one embodiment of the present invention, there is provided a power feeding system including: a power feeding device including a feeding coil; and a power receiving device including a receiving coil, the power feeding system being configured to supply electric power from the power feeding device to the power receiving device through electromagnetic induction, the power receiving device including: a resonant circuit including: the receiving coil configured to receive the electric power from the feeding coil; a resonant capacitor configured to resonate with the receiving coil; and a first switching element configured to control a resonant state by changing an electrical connection state of the resonant capacitor; a rectifying diode configured to rectify received power which is received by the receiving coil from the feeding coil into DC power to supply the DC power to a load; and a resonance control unit configured to control the first switching element to a non-conductive state, based on the received power and power consumption of the load to which the received power is supplied, to set the resonant circuit to a non-resonant state, during a period including a subsequent conducting period from a beginning during which a current flows to the rectifying diode, and which is estimated in a resonant state of the resonant circuit, the power feeding device including: a second switching element, which is connected in series to the feeding coil, and is periodically switched between a conductive state and a non-conductive state with a drive signal for driving the feeding coil; and a drive control unit configured to determine whether or not the electric power is allowed to be supplied to the power receiving device based on a periodic waveform variation in an excited voltage excited in the feeding coil, the periodic waveform variation being detected based on a change in electrical connection state of the resonant capacitor, and to control whether or not to continue supply of the drive signal to the second switching element based on a result of the determination.

Further, according to one embodiment of the present invention, there is provided a power receiving device, which is configured to receive electric power from a power feeding device through electromagnetic induction, the power feeding device including: a feeding coil, a second switching element, which is connected in series to the feeding coil, and is periodically switched between a conductive state and a non-conductive state with a drive signal for driving the feeding coil; and a drive control unit configured to determine whether or not the electric power is allowed to be supplied to the power receiving device based on a periodic waveform variation in an excited voltage excited in the feeding coil, and to control whether or not to continue supply of the drive signal to the second switching element based on a result of the determination, the power receiving device including: a resonant circuit including: a receiving coil configured to receive the electric power from the feeding coil; a resonant capacitor configured to resonate with the receiving coil; and a first switching element configured to control a resonant state by changing an electrical connection state of the resonant capacitor; a rectifying diode configured to rectify received power, which is received by the receiving coil from the feeding coil, into DC power to supply the DC power to a load; and a resonance control unit configured to control the first switching element to a non-conductive state, when setting by controlling the first switching element based on the received power and power consumption of the load to which the received power is supplied, to set the resonant circuit to a non-resonant state, during a period including a subsequent conducting period from a beginning during which a current flows to the rectifying diode, and which is estimated in a resonant state of the resonant circuit.

Still further, according to one embodiment of the present invention, there is provided a power feeding method for a power feeding system, the power feeding system including a power feeding device and a power receiving device, the power feeding system being configured to supply electric power from the power feeding device to the power receiving device through electromagnetic induction, the power receiving device including: a resonant circuit including: a receiving coil configured to receive the electric power from a feeding coil; a resonant capacitor configured to resonate with the receiving coil; and a first switching element configured to perform switching between a resonant state and a non-resonant state by changing an electrical connection state of the resonant capacitor; and a rectifying diode configured to rectify received power, which is received by the receiving coil from the feeding coil, into DC power to supply the DC power to a load, the power feeding device including the feeding coil, the power feeding method including: a drive signal supply step of causing the power feeding device to supply a second switching element connected in series to the feeding coil with a drive signal for driving the feeding coil by periodically switching the second switching element between a conductive state and a non-conductive state; a resonance control step of causing the power receiving device to set, when setting the resonant circuit to the non-resonant state by controlling the first switching element based on the received power and power consumption of the load to which the received power is supplied, the first switching element to a non-conductive state during a period including a subsequent conducting period from a beginning during which a current flows to the rectifying diode, and which is estimated in a resonant state of the resonant circuit; and a drive control step of causing the power feeding device to determine whether or not the electric power is allowed to be supplied to the power receiving device based on a periodic waveform variation in an excited voltage excited in the feeding coil, the periodic waveform variation being detected based on a change in electrical connection state of the resonant capacitor, and to control whether or not to continue supply of the drive signal to the second switching element based on a result of the determination.

According to the present invention, it is possible to reduce the risk of an erroneous determination about whether or not electric power can be supplied to the power receiving device.

DETAILED DESCRIPTION OF THE EMBODIMENTS

Now, a power feeding system according to one embodiment of the present invention is described with reference to the drawings.

Figure 1:
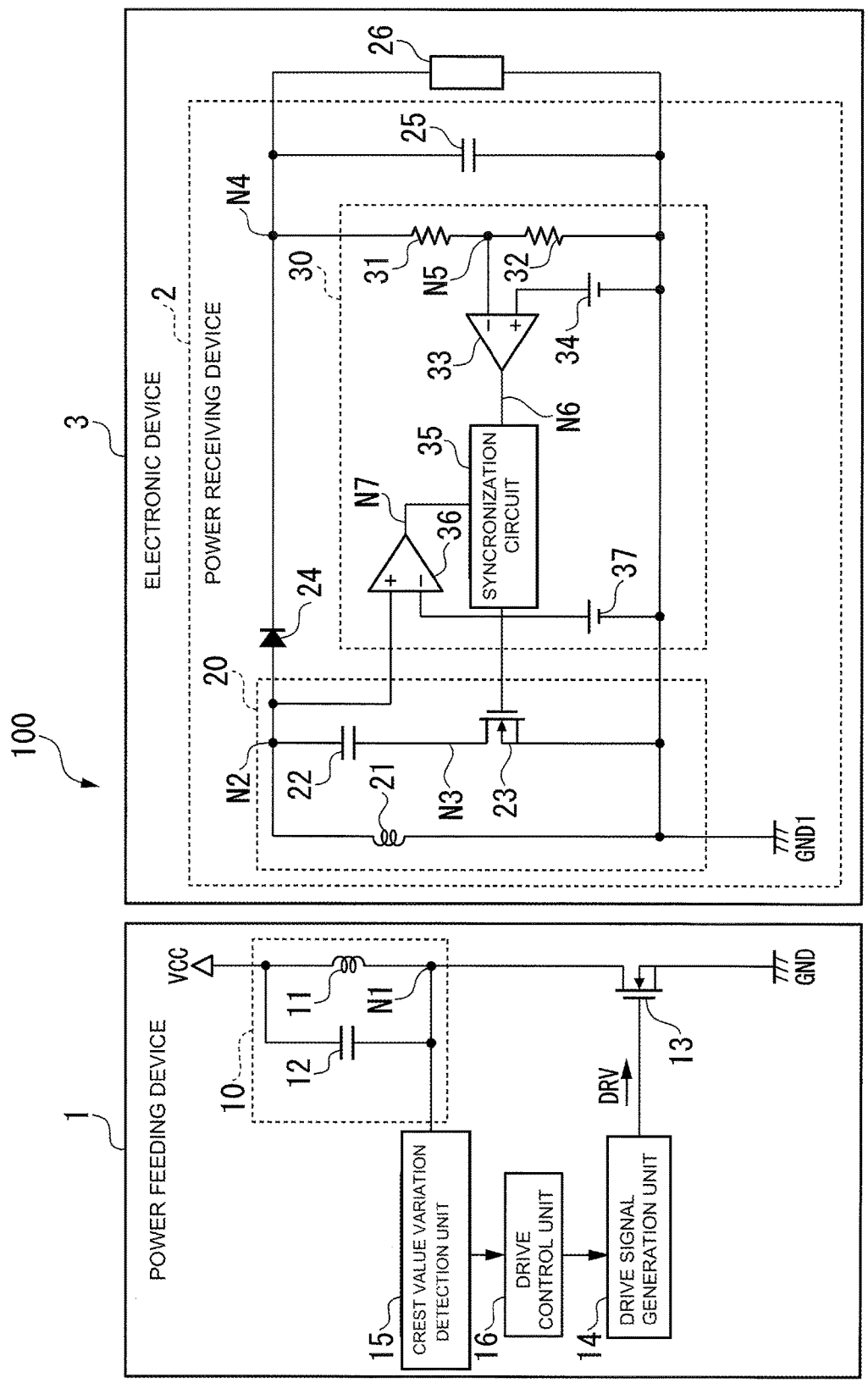
FIG. 1 is a functional block diagram for illustrating an example of a power feeding system according to a first embodiment of the present invention.

FIG. 1 is a block diagram for illustrating an example of a power feeding system 100 according to the embodiment of the present invention.

As illustrated in FIG. 1, the power feeding system 100 includes a power feeding device 1 and an electronic device 3 including a power receiving device 2.

The power feeding system 100 is a system configured to supply electric power from the power feeding device 1 to the power receiving device 2 wirelessly (in a non-contact manner). For example, the power feeding system 100 is configured to supply electric power for operating a load 26 included in the power receiving device 2 from the power feeding device 1 to the power receiving device 2.

The electronic device 3 is, for example, a mobile phone terminal or a personal digital assistant (PDA), and includes the power receiving device 2 and the load 26. Further, the power feeding device 1 is, for example, a charger compatible with the power receiving device 2.

<Configuration of Power Feeding Device 1>

The power feeding device 1 includes a feeding coil 11, a resonant capacitor 12, a drive transistor 13, a drive signal generation unit 14, a crest value variation detection unit 15, and a drive control unit 16.

The feeding coil 11 has a first terminal connected to a VCC terminal, and a second terminal connected to a node N1. The feeding coil 11 is a coil configured to supply electric power to a receiving coil 21 included in the power receiving device 2 through, for example, electromagnetic induction or electromagnetic coupling. For supplying electric power to the load 26, the feeding coil 11 is arranged to be opposed to the receiving coil 21 to supply electric power to the receiving coil 21 through electromagnetic induction.

The resonant capacitor 12 is a capacitor that is connected in parallel to the feeding coil 11, and is configured to resonate with the feeding coil 11. The feeding coil 11 and the resonant capacitor 12 form a resonant circuit 10. The resonant circuit 10 is configured to resonate at a predetermined resonant frequency (for example, 100 kHz (kilohertz)) determined by an inductance value of the feeding coil 11 and a capacitance value of the resonant capacitor 12.

The drive transistor 13 (second switching element) is, for example, a field effect transistor (FET), and is connected in series to the resonant circuit 10. In this embodiment, the case in which the drive transistor 13 is an N-channel metal oxide semiconductor (MOS) FET is described as an example. In the following, "MOSFET" is sometimes referred to as a MOS transistor, and "N-channel MOS transistor" is sometimes referred to as an NMOS transistor.

Specifically, the drive transistor 13 has a source terminal connected to a GND terminal, a gate terminal connected to an output signal line of the drive control unit 50, and a drain terminal connected to the node N1. The drive transistor 13 is controlled by the drive control unit 50 to periodically repeat an ON state (conductive state) and an OFF state (non-conductive state). In other words, the supply and release of electric power to and from the resonant circuit 10 are repeated by the switching operation of the drive transistor 13. In this manner, a periodic signal is generated in the feeding coil 11, and electric power is supplied from the feeding coil 11 to the receiving coil 21 through electromagnetic induction.

The drive signal generation unit 14 is configured to generate the drive signal DRV for driving the feeding coil 11, by switching the drive transistor 13 between the ON state and the OFF state. As used herein, the drive signal DRV is a signal for periodically switching the drive transistor 13 between the ON state and the OFF state. In other words, the drive signal generation unit 14 is configured to generate the drive signal DRV for periodically controlling the ON state/OFF state of the drive transistor 13. Further, the drive signal generation unit 14 is configured to output the drive signal DRV or stop outputting the drive signal DRV based on the control signal output from the drive control unit 16.

The crest value variation detection unit 15 (example of a variation detection unit) is configured to detect a change in resonant state of a resonant circuit 20 of the power receiving device 2, which occurs in relation to a connection state of a resonant capacitor 22 of the power receiving device 2 to be described later, as a periodic waveform variation in an excited voltage excited in the feeding coil 11. The periodic waveform variation includes a variation in peak voltage of the excited voltage. In the first embodiment, the crest value variation detection unit 15 is configured to detect the change in resonant state of the resonant circuit 20 of the power receiving device 2 as the variation in peak voltage of the excited voltage excited in the feeding coil 11. The crest value variation detection unit 15 is configured to output detection results of the variation in peak voltage to the drive control unit 16.

The crest value variation detection unit 15 is configured to hold the peak voltage excited by the feeding coil 11, for example, through use of a sample-and-hold circuit, to thereby detect the variation in peak voltage.

The drive control unit 16 is configured to supply the drive signal DRV generated by the drive signal generation unit 14 to the drive transistor 13 and determine whether or not electric power can be supplied to the power receiving device 2 based on the periodic waveform variation in the excited voltage excited in the feeding coil 11, which is detected based on a change in electrical connection state of the resonant capacitor 22. The drive control unit 16 is configured to control whether or not to continue the supply of the drive signal to the drive transistor 13 based on a result of the determination. Specifically, the drive control unit 16 is configured to determine based on the variation in peak voltage detected by the crest value variation detection unit 15 whether or not electric power can be supplied to the power receiving device 2, and control whether or not to continue the supply of the drive signal DRV to the drive transistor 13 based on a result of the determination.

For example, when it is determined that electric power can be supplied to the power receiving device 2, the drive control unit 16 causes the drive signal generation unit 14 to continue the supply of the drive signal DRV, thereby performing continuous drive for continuously driving the feeding coil 11. Meanwhile, for example, when it is determined that electric power cannot be supplied to the power receiving device 2, the drive control unit 16 causes the drive signal generation unit 14 to stop the supply of the drive signal DRV, thereby performing intermittent drive for intermittently (non-continuously) driving the feeding coil 11. The state in which electric power cannot be supplied to the power receiving device 2 (power supply impossible state) refers to, for example, the case in which there is no power receiving device 2 (including the case in which the feeding coil 11 and the receiving coil 21 are not located at appropriate positions) and the case in which a metallic foreign object is placed on the feeding coil 11.

Specifically, for example, the drive control unit 16 causes the drive signal generation unit 14 to supply the drive signal DRV to the drive transistor 13 in a predefined detection period (first period), and causes the crest value variation detection unit 15 to detect the variation in peak voltage. Then, when it is determined in this detection period that electric power can be supplied to the power receiving device 2, the drive control unit 16 causes the drive signal generation unit 14 to continue the supply of the drive signal DRV to the drive transistor 13 for a predefined power supply period (second period) after the detection period, to thereby continuously drive the feeding coil 11. When it is determined in this detection period that electric power cannot be supplied to the power receiving device 2, the drive control unit 16 causes the drive signal generation unit 14 to stop the supply of the drive signal DRV to the drive transistor 13 in the power supply period after the detection period, to thereby intermittently drive the feeding coil 11.

<Configuration of Power Receiving Device 2>

The power receiving device 2 includes the receiving coil 21, the resonant capacitor 22, a resonance control transistor 23, a rectifying diode 24, a smoothing capacitor 25, and a resonance control unit 30. Further, the power receiving device 2 is configured to supply electric power received from the power feeding device 1 to the load 26.

The receiving coil 21 has a first terminal connected to a node N2, and a second terminal connected to a GND1 terminal. The receiving coil 21 is a coil supplied with electric power from the feeding coil 11 included in the power feeding device 1 through, for example, electromagnetic induction or electromagnetic coupling. For supplying electric power to the load 26, the receiving coil 21 is arranged to be opposed to the feeding coil 11.

The resonant capacitor 22 is a capacitor that is connected in parallel to the receiving coil 21, and is configured to resonate with the receiving coil 21. The resonant capacitor 22 is connected between the node N2 and a node N3.

The receiving coil 21, the resonant capacitor 22, and the resonance control transistor 23 form the resonant circuit 20. The resonant circuit 20 is configured to resonate at a predetermined resonant frequency (for example, 100 kHz) determined by an inductance value of the receiving coil 21 and a capacitance value of the resonant capacitor 22. In this embodiment, the resonant frequency of the power receiving device 2 and the resonant frequency of the power feeding device 1 are equal to each other, for example, 100 kHz.

The resonance control transistor 23 (example of a first switching element) is a switching element configured to switch the resonant circuit 20 between the resonant state and the non-resonant state by changing an electrical connection state of the resonant capacitor 22. The resonance control transistor 23 is connected in parallel to the receiving coil 21 together with the resonant capacitor 22, and is connected in series to the resonant capacitor 22. The resonance control transistor 23 is, for example, an NMOS transistor, and has a source terminal connected to the GND1 terminal, and a drain terminal connected to the node N3. The resonance control transistor 23 has a gate terminal connected to an output signal line of the resonance control unit 30 to be described later. When the resonance control transistor 23 is set to the ON state by the resonance control unit 30, the resonant capacitor 22 functions to resonate the resonant circuit 20. When the resonance control transistor 23 is set to the OFF state by the resonance control unit 30, the resonant capacitor 22 is electrically disconnected to stop the resonance of the resonant circuit 20.

The rectifying diode 24 (rectifier unit) has an anode terminal connected to the node N2 corresponding to one terminal of the receiving coil 21, and a cathode terminal connected to a node N4 corresponding to one terminal of the smoothing capacitor 25. The rectifying diode 24 is configured to rectify electric power received by the receiving coil 21, and convert the rectified electric power into DC electric power. Specifically, the rectifying diode 24 is configured to convert AC electric power (AC voltage) generated in the receiving coil 21 into DC electric power (DC voltage), to thereby supply electric power to the load 26.

The smoothing capacitor 25 is configured to smooth the DC electric power obtained through the conversion by the rectifying diode 24.

The load 26 is, for example, various circuits, a drive unit, or a circuit configured to charge a rechargeable battery or a secondary battery included in the electronic device 3, and is operated or charged with a DC voltage rectified by the rectifying diode 24. The load 26 may be, for example, a system using a microcomputer, a power supply circuit of the system, an audio amplifier, a radio circuit, a sensor circuit, an illumination drive circuit, or a display circuit.

The resonance control unit 30 is configured to control the resonant state of the resonant circuit 20 by controlling the resonance control transistor 23. The resonance control unit 30 is configured to control the resonance control transistor 23 based on received power, which is received by the receiving coil 21 from the feeding coil 11, and power consumption of the load 26 to which the received power is supplied. The resonance control unit 30 is configured to control the resonance control transistor 23, for example, based on a voltage of a supply line (voltage of the node N4) through which the received power, which is received by the receiving coil 21 and rectified, is supplied to the load 26. The voltage of the supply line (voltage of the node N4) varies depending on the received power and the power consumption of the load 26. Therefore, the control of the resonance control transistor 23 based on the voltage of the supply line (voltage of the node N4) is an example of the control of the resonance control transistor 23 based on the received power and the power consumption of the load 26.

The resonance control unit 30 is configured to control the resonance control transistor 23 so that the resonant circuit 20 is set to the non-resonant state, for example, when the voltage of the supply line (voltage of the node N4) is equal to or more than a predetermined threshold value. Meanwhile, the resonance control unit 30 is configured to control the resonance control transistor 23 so that the resonant circuit 20 is set to the resonant state, for example, when the voltage of the supply line (voltage of the node N4) is less than the predetermined threshold value.

Further, when setting the resonant circuit 20 to the non-resonant state, the resonance control unit 30 sets the resonance control transistor 23 to the OFF state during a period including a subsequent conducting period during which a current flows to the rectifying diode 24, and is estimated in the resonant state of the resonant circuit 20. For example, the resonance control unit 30 sets the resonance control transistor 23 to the OFF state in synchronization with timing at which a voltage of the receiving coil 21 (node N2) becomes equal to or less than a predetermined voltage value (for example, 0 V or less), and sets the resonance control transistor 23 to the ON state after an elapse of a predetermined period after the resonance control transistor 23 is set to the OFF state.

In this case, the predetermined period is determined based on, for example, one cycle of the drive signal DRV (corresponding to one cycle of the voltage of the receiving coil 21). The predetermined period is, for example, a period corresponding to one cycle of the drive signal DRV, a period obtained by multiplying one cycle of the drive signal DRV by a predetermined ratio, or a period obtained by adding or subtracting a predetermined value to or from one cycle of the drive signal DRV in consideration of a variation. When setting the resonant circuit 20 to the non-resonant state, the resonance control unit 30 may set the resonance control transistor 23 to the OFF state during a period including an entire period of the estimated subsequent conducting period. In the following description, the cycle of the drive signal DRV is sometimes referred to as "drive cycle".

Further, the resonance control unit 30 includes resistors 31 and 32, comparators 33 and 36, a synchronization circuit 35, and reference power supplies 34 and 37.

The resistor 31 has a first terminal connected to the node N4, and a second terminal connected to a node N5. Further, the resistor 32 has a first terminal connected to the node N5, and a second terminal connected to the GND1 terminal. The resistor 31 and the resistor 32 are connected in series between the node N4 and the GND1 terminal. Through the resistor 31 and the resistor 32, a voltage, which is obtained by decreasing the voltage of the node N4 by voltage division at a ratio between resistance values of the resistor 31 and the resistor 32, is output to the node N5.

The comparator 33 (example of a resonance determination unit) has a positive input terminal connected to the reference power supply 34, and a negative input terminal connected to the node N5. The comparator 33 is configured to compare the voltage of the node N5 and an output voltage of the reference power supply 34 to each other and output a signal (low (L) state) for turning off the resonance control transistor 23 to a node N6 when the voltage of the node N5 is equal to or more than the output voltage of the reference power supply 34. Further, the comparator 33 is configured to output a signal (high (H) state) for turning on the resonance control transistor 23 to the node N6 when the voltage of the node N5 is less than the output voltage of the reference power supply 34. Further, the reference power supply 34 is a constant voltage source configured to output a predetermined threshold voltage. Thus, the comparator 33 is configured to determine whether or not the resonant circuit 20 is to be set to the non-resonant state (whether or not the resonance control transistor 23 is to be turned off) based on the received power and the power consumption of the load 26 to which the received power is supplied.

The comparator 36 has a positive input terminal connected to the node N2 and a negative input terminal connected to the reference power supply 37. The comparator 36 is configured to compare the voltage of the node N2 (voltage of the receiving coil 21) and an output voltage (predetermined voltage) of the reference power supply 37 to each other. When the voltage of the node N2 is equal to or less than the output voltage (for example, a predetermined voltage value (voltage V0) or less) of the reference power supply 37, the comparator 36 outputs an L state to a node N7. Meanwhile, when the voltage of the node N2 is larger than the output voltage of the reference power supply 37, the comparator 36 outputs an H state to the node N7. In this case, the voltage of the node N2 (voltage of the receiving coil 21) has both values of a positive voltage and a negative voltage with respect to the power supply GND1, and the output voltage of the reference power supply 37 is, for example, 0 V.

When the comparator 33 determines that the resonant circuit 20 is to be set to the non-resonant state (the resonance control transistor 23 is to be set to the OFF state), the synchronization circuit 35 (example of a signal generation unit) generates a control signal for controlling the resonance control transistor 23 to the OFF state. The synchronization circuit 35 is configured to generate the control signal based on an output signal of the comparator 33 (signal of the node N6) and an output signal of the comparator 36 (signal of the node N7) to output the control signal to the gate terminal of the resonance control transistor 23. For example, the synchronization circuit 35 sets the resonance control transistor 23 to the OFF state in synchronization with timing at which the voltage of the receiving coil 21 (node N2) becomes equal to or less than the predetermined voltage value (for example, 0 V or less), and sets the resonance control transistor 23 to the ON state after an elapse of the predetermined period after the resonance control transistor 23 is set to the OFF state.

Specifically, when the output of the comparator 33 (voltage of the node N6) is set to the L state, the synchronization circuit 35 outputs the L state to the gate terminal of the resonance control transistor 23 in synchronization with fall timing of the output of the comparator 36 (voltage of the node N7). Meanwhile, when the output of the comparator 33 (voltage of the node N6) is in the H state after an elapse of the predetermined period (for example, one cycle of the drive signal DRV), the synchronization circuit 35 outputs the H state to the gate terminal of the resonance control transistor 23.

Next, the operation of the power feeding system 100 according to the first embodiment is described with reference to the drawings.

Figure 2:
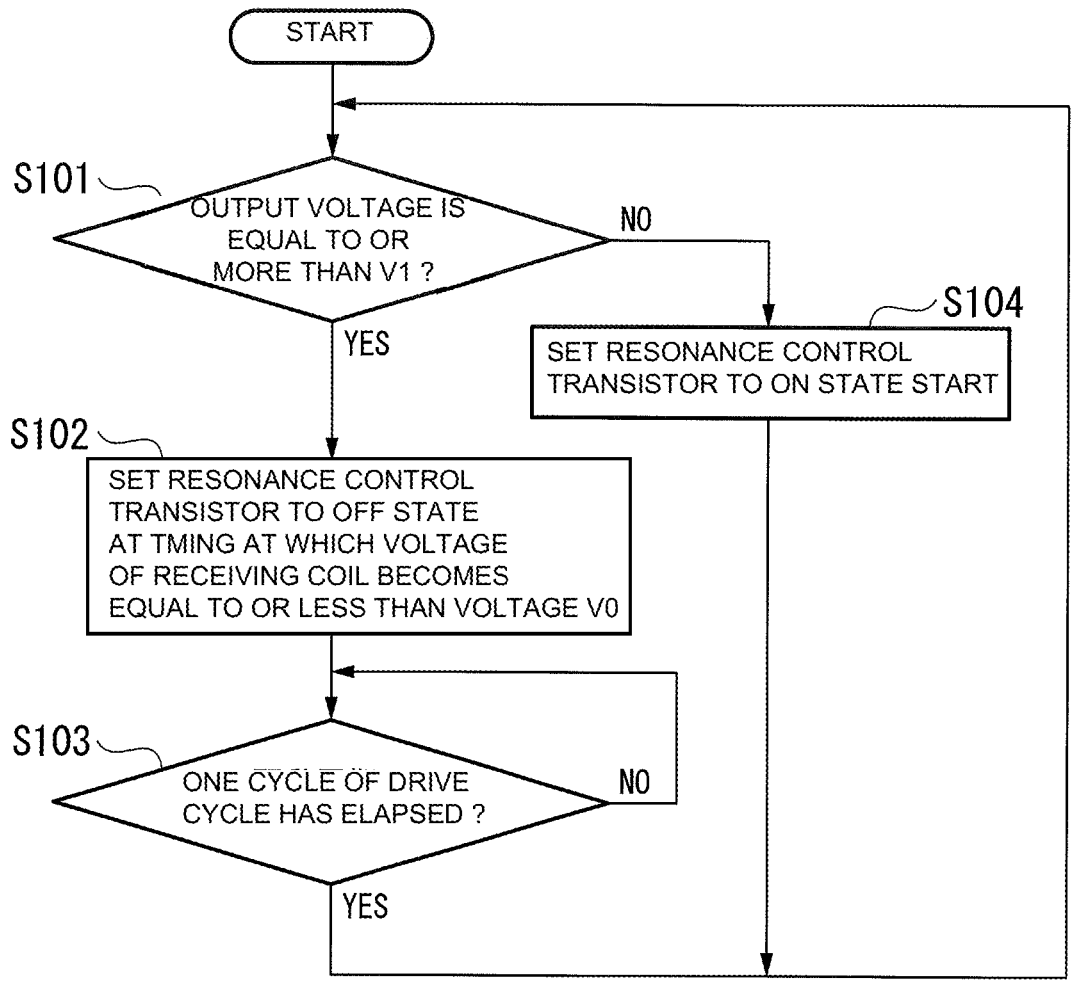
FIG. 2 is a flowchart for illustrating an example of resonance control processing of a power receiving device according to the first embodiment.

FIG. 2 is a flowchart for illustrating an example of resonance control processing of the power receiving device 2 according to the first embodiment.

In FIG. 2, when electric power is supplied wirelessly (in a non-contact manner) from the feeding coil 11 of the power feeding device 1 to the receiving coil 21 of the power receiving device 2, the power receiving device 2 determines whether or not the output voltage (voltage of the node N4) output via the rectifying diode 24 is equal to or more than a voltage V1 (predetermined threshold value or more) (Step S101). Specifically, the resonance control unit 30 subjects the voltage of the node N4 (output voltage) to the voltage division of the resistor 31 and the resistor 32, and compares, by the comparator 33, the voltage obtained by the voltage division (voltage of the node N5) and the output voltage of the reference power supply 34 to each other. In this way, the resonance control unit 30 determines whether or not the voltage of the node N4 (output voltage) is equal to or more than the voltage V1.

When the voltage of the node N4 (output voltage) is equal to or more than the voltage V1 (Step S101: YES), the resonance control unit 30 advances the flow to Step S102. Meanwhile, when the voltage of the node N4 (output voltage) is less than the voltage V1 (Step S101: NO), the resonance control unit 30 advances the flow to Step S104.

In Step S102, the resonance control unit 30 sets the resonance control transistor 23 to the OFF state at timing at which the voltage of the receiving coil 21 (voltage of the node N2) becomes equal to or less than the voltage V0 (predetermined voltage value or less). That is, when the output of the comparator 33 (voltage of the node N6) is set to the L state, the synchronization circuit 35 outputs the L state to the gate terminal of the resonance control transistor 23 in synchronization with fall timing of the output of the comparator 36 (voltage of the node N7).

Next, the synchronization circuit 35 of the resonance control unit 30 determines whether or not one cycle of the drive cycle has elapsed (Step S103). The drive cycle is predefined, and hence the synchronization circuit 35 determines whether or not one cycle of the drive cycle has elapsed through use of, for example, a one-shot multi vibrator circuit or a timer circuit. When one cycle of the drive cycle has not elapsed (Step S103: NO), the synchronization circuit 35 returns the flow to Step S103 and repeats the processing in Step S103 until one cycle of the drive cycle elapses.

Meanwhile, when one cycle of the drive cycle has elapsed (Step S103: YES), the synchronization circuit 35 returns the flow to Step S101. In Step S101, when the voltage of the node N4 (output voltage) is less than the voltage V1, the synchronization circuit 35 outputs the H state to the gate terminal of the resonance control transistor 23 (Step S104). After the processing in Step S104, the synchronization circuit 35 returns the flow to Step S101.

As described above, in the first embodiment, the synchronization circuit 35 is configured to set the resonance control transistor 23 to the OFF state in synchronization with the timing at which the voltage of the receiving coil 21 (voltage of the node N2) becomes equal to or less than the predetermined voltage value (voltage V0 or less), and set the resonance control transistor 23 to the ON state after an elapse of the predetermined period (after an elapse of one cycle of the drive cycle) after the resonance control transistor 23 is set to the OFF state. This operation corresponds to operation in which the resonance control unit 30 sets the resonance control transistor 23 to the OFF state during a period including a subsequent conducting period during which a current flows to the rectifying diode 24, and is estimated in the resonant state of the resonant circuit 20.

Next, a specific example of the resonance control processing of the power receiving device 2 according to the first embodiment is described with reference to FIG. 3.

Figure 3:
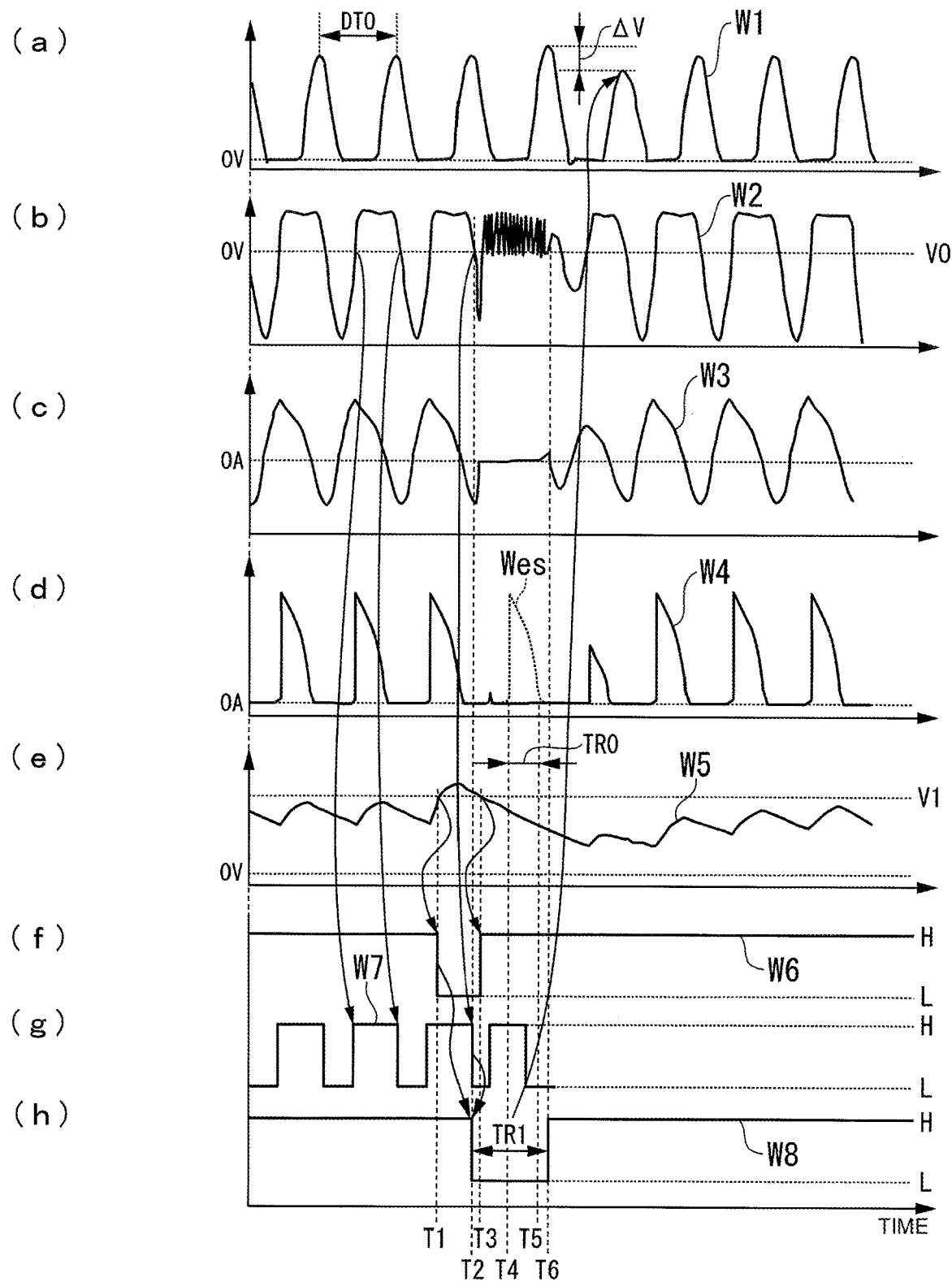
FIG. 3 is a timing chart for illustrating an example of the resonance control processing of the power receiving device according to the first embodiment.

FIG. 3 is a flowchart for illustrating an example of the resonance control processing of the power receiving device 2 according to the first embodiment.

In FIG. 3, waveforms W1 to W8 represent, in the order from above, (a) a voltage of the feeding coil 11 (voltage of the node N1), (b) a voltage of the receiving coil 21 (voltage of the node N2), (c) a current of the receiving coil 21, (d) a current of the rectifying diode 24, (e) an output voltage (load supply voltage), (f) a voltage of the node N6 (output voltage of the comparator 33), (g) a voltage of the node N7 (output voltage of the comparator 36), and (h) a gate voltage of the resonance control transistor 23. In this case, the current (c) of the receiving coil 21 is a current of the receiving coil 21 flowing to the rectifying diode 24. The vertical axis represents a voltage for the waveforms (a), (b), and (e), a current for the waveforms (c) and (d), and a logic state for the waveforms (f) to (h). The horizontal axis represents time.

Further, in FIG. 3, a waveform Wes of the broken line represents a current waveform of the rectifying diode 24 in a subsequent conducting period TR0 estimated in the resonant state of the resonant circuit 20. Further, a period DT0 represents the above-mentioned drive cycle.

In FIG. 3, the output voltage (voltage V0) of the reference power supply 37 is 0 V. The comparator 36 outputs the H state to the node N7 when the voltage of the receiving coil 21 (see the waveform W2) becomes larger than the voltage V0 (=0 V) and outputs the L state to the node N7 when the voltage of the receiving coil 21 becomes equal to or less than the voltage V0 (=0 V) (see the waveform W7).

Further, when the voltage of the node N4 (see the waveform W5) becomes equal to or more than the voltage V1 at a time T1, the comparator 33 outputs the L state to the node N6. That is, the comparator 33 changes the voltage of the node N6 from the H state to the L state (see the waveform W6).

Next, when the voltage of the receiving coil 21 (voltage of the node N2) becomes equal to or less than 0 V at a time T2 (see waveform W2), the comparator 36 outputs the L state to the node N7. That is, the comparator 36 changes the voltage of the node N7 from the H state to the L state (see the waveform W7). The synchronization circuit 35 sets the gate voltage of the resonance control transistor 23 to the L state (see the waveform W8) in synchronization with fall timing of the node N7 from the H state to the L state. With this, the resonance control transistor 23 is set to the OFF state, and the resonant circuit 20 is set to the non-resonant state.

Meanwhile, when the voltage of the node N4 (see the waveform W5) becomes less than the voltage V1 at a time T3, the comparator 33 outputs the H state to the node N6. That is, the comparator 33 changes the voltage of the node N6 from the L state to the H state (see the waveform W6).

Further, the synchronization circuit 35 waits for an elapse of the conducting period TR0 based on the drive cycle DT0. When the voltage of the node N6 is in the H state at a time T6, the synchronization circuit 35 sets the gate voltage of the resonance control transistor 23 to the H state (see the waveform W8). With this, the resonance control transistor 23 is set to the ON state, and the resonant circuit 20 is set to the resonant state again.

As represented by the waveform Wes, a period from a time T4 to a time T5 corresponds to the subsequent conducting period TR0 estimated in the resonant state of the resonant circuit 20, and the estimated subsequent conducting period TR0 is included in a period from the time T2 to the time T6 during which the resonance control transistor 23 is set to the OFF state. That is, when setting the resonant circuit 20 to the non-resonant state, the resonance control unit 30 sets the resonance control transistor 23 to the OFF state during the period including the entire period of the estimated subsequent conducting period TR0.

As a result, a portion of the waveform Wes is not generated in the current of the rectifying diode 24, and the current of the receiving coil 21 decreases. This decrease in current is transmitted from the receiving coil 21 to the feeding coil 11, and a waveform variation, in which a peak voltage value decreases by a voltage difference ΔV, occurs in the voltage of the feeding coil 11 (voltage of the node N1).

Next, drive control processing of the power feeding device 1 according to the first embodiment is described with reference to FIG. 4 and FIG. 5.

Figure 4:
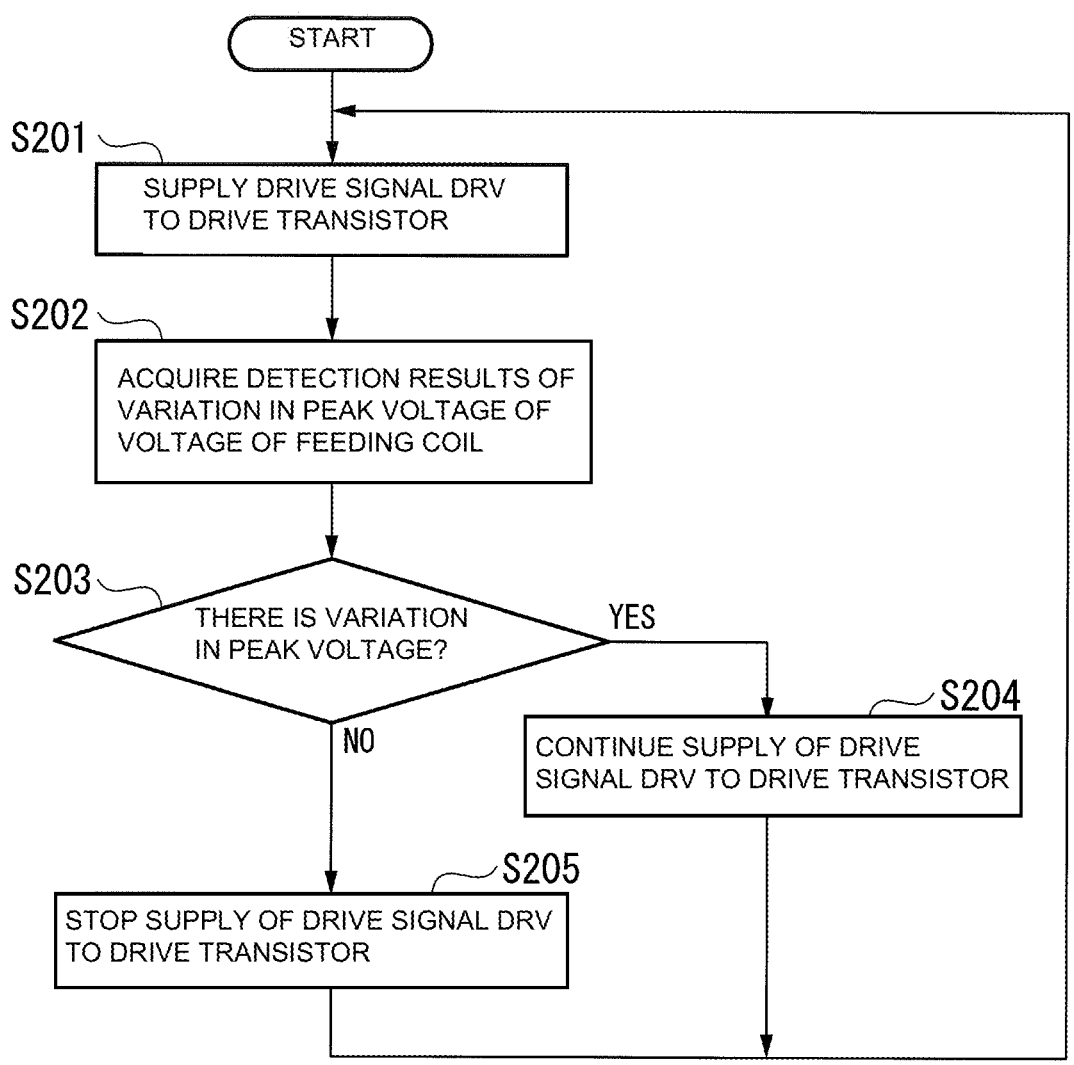
FIG. 4 is a flowchart for illustrating an example of drive control processing of a power feeding device according to the first embodiment.

FIG. 4 is a flowchart for illustrating an example of the drive control processing of the power feeding device 1 according to the first embodiment.

In FIG. 4, first, the power feeding device 1 performs control so that the drive signal DRV is supplied to the drive transistor 13 (Step S201). Specifically, the drive control unit 16 of the power feeding device 1 causes the drive signal generation unit 14 to supply the drive signal DRV to the gate terminal of the drive transistor 13. With this, the power feeding device 1 periodically switches the drive transistor 13 between the ON state and the OFF state and supplies the drive signal DRV for driving the feeding coil 11 to the drive transistor 13.

Next, the drive control unit 16 acquires the detection results of the variation in peak voltage of the voltage of the feeding coil 11 (Step S202). That is, the crest value variation detection unit 15 detects the variation in peak voltage, and the drive control unit 16 acquires the detection results of the variation in peak voltage detected by the crest value variation detection unit 15.

Next, the drive control unit 16 determines whether or not there is a variation in peak voltage (Step S203). When there is a variation in peak voltage (Step S203: YES), the drive control unit 16 continues the supply of the drive signal DRV to the drive transistor 13 (Step S204). That is, the drive control unit 16 causes the drive signal generation unit 14 to continue outputting the drive signal DRV. After the processing in Step S204, the drive control unit 16 returns the flow to Step S201 after an elapse of a power supply period. With this, the power feeding device 1 continuously drives the feeding coil 11.

Meanwhile, when there is no variation in peak voltage (Step S203: NO), the drive control unit 16 stops the supply of the drive signal DRV to the drive transistor 13 (Step S205). That is, the drive control unit 16 causes the drive signal generation unit 14 to stop outputting the drive signal DRV. After the processing in Step S205, the drive control unit 16 returns the flow to Step S201 after an elapse of the power supply period. With this, the power feeding device 1 intermittently drives the feeding coil 11.

Figure 5:
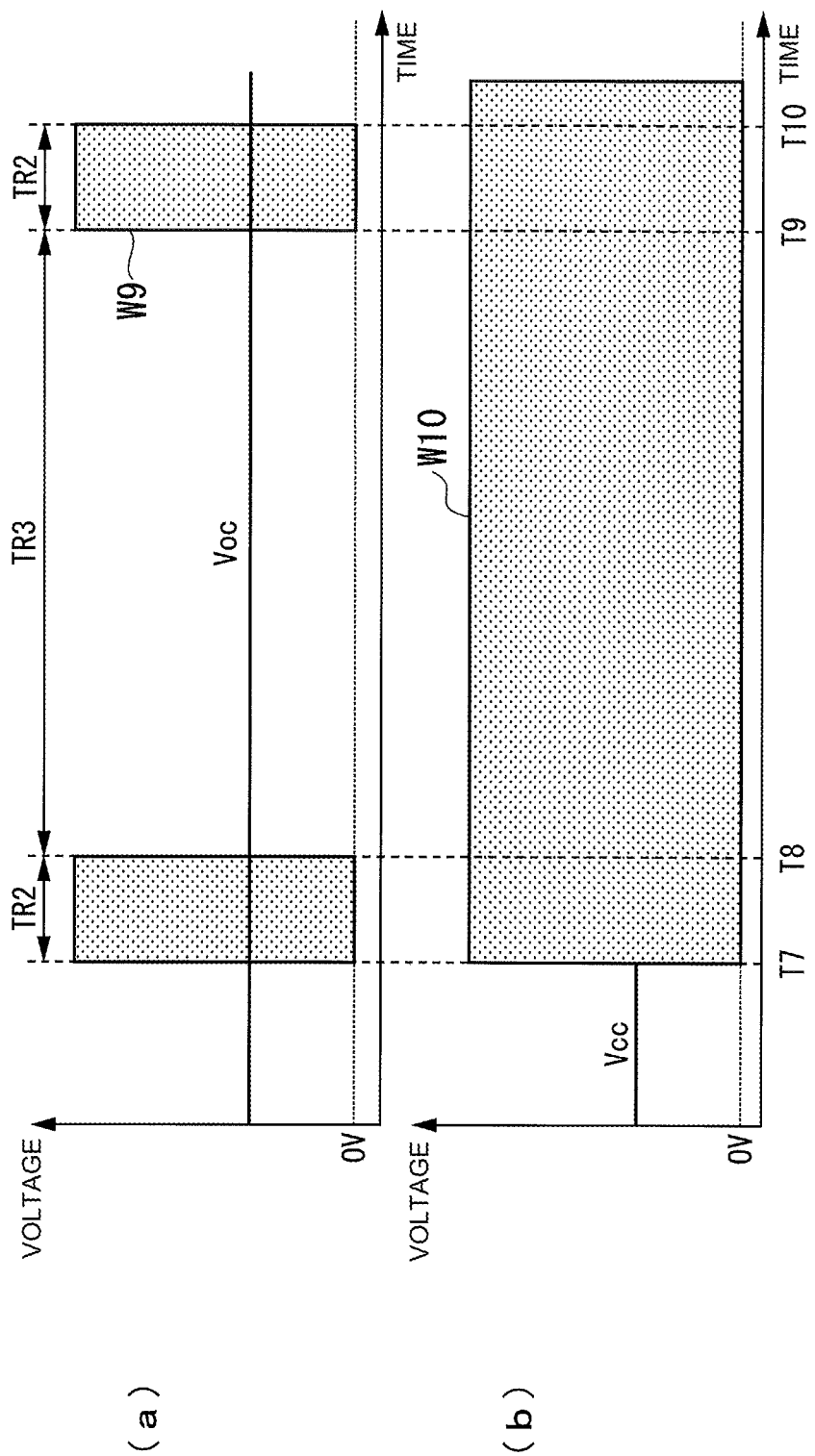
FIG. 5 is a timing chart for illustrating an example of operation of the power feeding device according to the first embodiment.

FIG. 5 is a timing chart for illustrating an example of the operation of the power feeding device 1 according to the first embodiment.

In FIG. 5, waveforms W9 and W10 represent, in the order from above, (a) a voltage of the feeding coil 11 when there is no power receiving device 2 and (b) a voltage of the feeding coil 11 when there is the power receiving device 2. The vertical axis represents a voltage for each waveform, and the horizontal axis represents time.

Further, in FIG. 5, a period TR2 from a time T7 to a time T8 (and from a time T9 to a time T10) corresponds to a detection period (first period), and a period TR3 from a time T8 to a time T9 corresponds to a power supply period (second period).

As represented by the waveform W9 in (a) of FIG. 5, the drive control unit 16 of the power feeding device 1 supplies the drive signal DRV to the drive transistor 13 to drive the feeding coil 11 in the detection period (period TR2) from the time T7 to the time T8. In this case, there is no power receiving device 2, and hence the drive control unit 16 does not detect a periodic peak voltage variation in the voltage of the feeding coil 11 in the detection period (period TR2). The drive control unit 16 therefore stops the supply of the drive signal DRV to the drive transistor 13 to intermittently drive the feeding coil 11 during the period TR3 from the time T8 to the time T9. While the supply of the drive signal DRV is stopped, the voltage of the feeding coil 11 becomes a voltage Vcc of the power supply VCC.

In contrast, in the example illustrated in (b) of FIG. 5, there is the power receiving device 2, and hence, as represented by the waveform W10, the drive control unit 16 detects a periodic peak voltage variation in the voltage of the feeding coil 11 in the detection period (period TR2). The drive control unit 16 therefore continues the supply of the drive signal DRV to the drive transistor 13 as represented by the waveform W10 to continuously drive the feeding coil 11 during the period TR3 (power supply period) from the time T8 to the time T9.

In the power feeding system 100 according to the first embodiment, the power receiving device 2 is configured to set the resonant circuit 20 to the non-resonant state at timing at which a peak voltage variation is reliably caused as illustrated in FIG. 2. The power feeding device 1 can therefore accurately detect a periodic peak voltage variation in the voltage of the feeding coil 11.

As described above, the power feeding system 100 according to the first embodiment includes the power feeding device 1 including the feeding coil 11, and the power receiving device 2 including the receiving coil 21, and is configured to supply electric power from the power feeding device 1 to the power receiving device 2 through electromagnetic induction. The power receiving device 2 includes the resonant circuit 20, the rectifying diode 24, and the resonance control unit 30. The resonant circuit 20 includes the receiving coil 21 configured to receive electric power from the feeding coil 11, the resonant capacitor 22 configured to resonate with the receiving coil 21, and the resonance control transistor 23 (first switching element) configured to control the resonant state by changing an electrical connection state of the resonant capacitor 22. The rectifying diode 24 is configured to rectify received power, which is received by the receiving coil 21 from the feeding coil 11, into DC power, and supply the DC power to the load 26. When the resonance control unit 30 sets the resonant circuit 20 to the non-resonant state by controlling the resonance control transistor 23 based on the received power and the power consumption of the load 26 to which the received power is supplied, the resonance control unit 30 sets the resonance control transistor 23 to the OFF state (non-conductive state) during the period including the subsequent conducting period (for example, the period TR0) during which a current flows to the rectifying diode 24, and is estimated in the resonant state of the resonant circuit 20. The power feeding device 1 includes the drive transistor 13 (second switching element) and the drive control unit 16. The drive transistor 13 is connected in series to the feeding coil 11, and is periodically switched between the ON state (conductive state) and the OFF state (non-conductive state) with the drive signal DRV for driving the feeding coil 11. The drive control unit 16 is configured to determine whether or not electric power can be supplied to the power receiving device 2 based on the periodic waveform variation (for example, the peak voltage variation) in the excited voltage excited in the feeding coil 11, the periodic waveform variation being detected based on the change in electrical connection state of the resonant capacitor 22, and to control whether or not to continue the supply of the drive signal to the drive transistor 13 based on a result of the determination.

With this, in the power feeding system 100 according to the first embodiment, when setting the resonant circuit 20 to the non-resonant state, the resonance control unit 30 sets the resonance control transistor 23 to the OFF state during the period including the estimated subsequent conducting period (for example, the period TR0) of the rectifying diode 24. As a result, the power feeding system 100 according to the first embodiment can increase a variation amount of the periodic waveform variation in the excited voltage excited in the feeding coil 11, (for example, the voltage difference $\Delta V$ of the peak voltage) in the power feeding device 1 as illustrated in FIG. 3. The power feeding system 100 according to the first embodiment can therefore accurately determine whether or not electric power can be supplied to the power receiving device 2, for example, even when switching between the resonant state and the non-resonant state occurs for each cycle in the power receiving device 2 during one cycle of drive of the feeding coil 11. Thus, the power feeding system 100 according to the first embodiment can reduce the risk that, in the power feeding device 1, an erroneous determination is made about whether or not electric power can be supplied to the power receiving device 2.

Further, the power feeding system 100 according to the first embodiment can reduce the risk of an erroneous determination about whether or not electric power can be supplied to the power receiving device 2, and hence, for example, the drive signal DRV can be continuously supplied to the drive transistor 13 when electric power can be supplied to the power receiving device 2, and the drive signal DRV can be stopped when electric power cannot be supplied to the power receiving device 2. For example, when a metallic foreign object is placed on the feeding coil 11, the power feeding system 100 according to the first embodiment can appropriately stop the supply of the drive signal DRV to the drive transistor 13, and hence heat generation caused by the metallic foreign object can be suppressed. Further, in the power feeding system 100 according to the first embodiment, the supply of the drive signal DRV to the drive transistor 13 can be stopped similarly also when there is no power receiving device 2, and hence standby power of the power feeding device 1 can be reduced.

Further, in the first embodiment, the resonance control unit 30 is configured to set the resonance control transistor 23 to the OFF state in synchronization with the timing at which the voltage of the receiving coil 21 becomes equal to less than the predetermined voltage value (for example, the voltage V0 of 0 V), and set the resonance control transistor 23 to the ON state after an elapse of the predetermined period (for example, after an elapse of the period TR1) after the resonance control transistor 23 is set to the OFF state.

With this, the power feeding system 100 according to the first embodiment can reduce the risk of an erroneous determination about whether or not electric power can be supplied to the power receiving device 2 with simple means for detecting the timing at which the voltage of the receiving coil 21 becomes equal to or less than the predetermined voltage value.

Further, in the first embodiment, when setting the resonant circuit 20 to the non-resonant state, the resonance control unit 30 sets the resonance control transistor 23 to the OFF state during the period including the entire period of the estimated subsequent conducting period (for example, the period TR0).

With this, the power feeding system 100 according to the first embodiment can reliably eliminate the conducting period (for example, the period TR0) during which a current flows to the rectifying diode 24 by setting the resonant circuit 20 to the non-resonant state. The power feeding system 100 according to the first embodiment can therefore further increase the periodic waveform variation of the voltage of the feeding coil 11 (for example, the voltage difference $\Delta V$ of the peak voltage).

Further, in the first embodiment, the above-mentioned predetermined period during which the OFF state of the resonance control transistor 23 is kept is determined based on one cycle of the drive signal DRV. The predetermined period is, for example, a period corresponding to one cycle of the drive signal DRV, a period obtained by multiplying one cycle of the drive signal DRV by a predetermined ratio, or a period obtained by adding or subtracting a predetermined value to or from one cycle of the drive signal DRV in consideration of a variation.

With this, the predetermined period is set based on one cycle of the drive signal DRV, and hence the power feeding system 100 according to the first embodiment can reliably and appropriately eliminate the subsequent conducting period of the rectifying diode 24. Thus, the power feeding system 100 according to the first embodiment can further increase the periodic waveform variation of the voltage of the feeding coil 11 (for example, the voltage difference ΔV of the peak voltage).

Further, in the first embodiment, the resonance control unit 30 includes the comparator 33 (resonance determination unit) and the synchronization circuit 35 (signal generation unit). The comparator 33 is configured to determine whether or not the resonant circuit 20 is to be set to the non-resonant state based on the received power and the power consumption of the load 26 to which the received power is supplied. When the comparator 33 determines that the resonant circuit 20 is to be set to the non-resonant state, the synchronization circuit 35 generates the control signal for setting the resonance control transistor 23 to the OFF state.

With this, the power feeding system 100 according to the first embodiment can appropriately generate the control signal for controlling the resonance control transistor 23 with a simple configuration.

Further, in the first embodiment, the drive control unit 16 is configured to supply the drive signal DRV to the drive transistor 13 in the predefined detection period TR2 (first period), and cause the crest value variation detection unit 15 to detect the peak voltage variation. When determining that electric power can be supplied to the power receiving device 2 in the detection period TR2, the drive control unit 16 continues the supply of the drive signal DRV to the drive transistor 13 in the predefined power supply period TR3 (second period) after the detection period TR2, to thereby continuously drive the feeding coil 11. When determining that electric power cannot be supplied to the power receiving device 2 in the detection period TR2, the drive control unit 16 stops the supply of the drive signal DRV to the drive transistor 13 in the power supply period TR3 (second period), to thereby intermittently drive the feeding coil 11.

With this, for example, when a metallic foreign object is placed on the feeding coil 11, the power feeding system 100 according to the first embodiment can intermittently drive the feeding coil 11, and hence heat generation caused by the metallic foreign object can be appropriately suppressed.

Further, in the first embodiment, the resonance control unit 30 is configured to control the resonance control transistor 23 so that the resonant circuit 20 is put into the resonant state when the voltage of the supply line (voltage of the node N4) through which the received power, which is received by the receiving coil 21 and rectified, is supplied to the load 26 is less than the predetermined threshold value (less than the voltage V1). Meanwhile, the resonance control unit 30 is configured to control the resonance control transistor 23 so that the resonant circuit 20 is put into the non-resonant state when the voltage of the supply line (voltage of the node N4) is equal to or more than the predetermined threshold value (voltage V1 or more).

With this, in the power feeding system 100 according to the first embodiment, the power receiving device 2 can appropriately perform switching between the resonant state and the non-resonant state by a simple procedure.

Further, the power receiving device 2 according to the first embodiment is configured to receive electric power from the power feeding device 1 including the feeding coil 11, the drive transistor 13, and the drive control unit 16 through electromagnetic induction, and includes the resonant circuit 20, the rectifying diode 24, and the resonance control unit 30. The resonant circuit 20 includes the receiving coil 21 configured to receive electric power from the feeding coil 11, the resonant capacitor 22 configured to resonate with the receiving coil 21, and the resonance control transistor 23 configured to control the resonant state by changing the electrical connection state of the resonant capacitor 22. The rectifying diode 24 is configured to rectify the received power, which is received by the receiving coil 21 from the feeding coil 11, into DC power, and supply the DC power to the load 26. When the resonance control unit 30 sets the resonant circuit 20 to the non-resonant state by controlling the resonance control transistor 23 based on the received power and the power consumption of the load 26 to which the received power is supplied, the resonance control unit 30 sets the resonance control transistor 23 to the OFF state during the period including the subsequent conducting period during which a current flows to the rectifying diode 24, and is estimated in the resonant state of the resonant circuit 20.

With this, the power receiving device 2 according to the first embodiment exhibits the same effects as those of the power feeding system 100 described above, and can reduce the risk of an erroneous determination about whether or not electric power can be supplied to the power receiving device 2.

A power feeding method according to the first embodiment is a power feeding method for the power feeding system 100 configured to supply electric power from the power feeding device 1 to the power receiving device 2 through electromagnetic induction, and includes a drive signal supply step, a resonance control step, and a drive control step. The power feeding system 100 includes the power receiving device 2 and the power feeding device 1. The power receiving device 2 includes the resonant circuit 20 including the receiving coil 21, the resonant capacitor 22, and the resonance control transistor 23 configured to perform switching between the resonant state and the non-resonant state by changing the electrical connection state of the resonant capacitor 22, and the rectifying diode 24 configured to rectify the received power, which is received by the receiving coil 21 from the feeding coil 11, into DC power, and supply the DC power to the load 26. The power feeding device 1 includes the feeding coil 11. In the drive signal supply step, the power feeding device 1 supplies the drive transistor 13 connected in series to the feeding coil 11 with the drive signal DRV for driving the feeding coil 11 by periodically switching the drive transistor 13 between the ON state and the OFF state. In the resonance control step, when the power receiving device 2 sets the resonant circuit 20 to the non-resonant state by controlling the resonance control transistor 23 based on the received power and the power consumption of the load 26 to which the received power is supplied, the power receiving device 2 sets the resonance control transistor 23 to the OFF state during the period including the subsequent conducting period during which a current flows to the rectifying diode 24, and is estimated in the resonant state of the resonant circuit 20. In the drive control step, the power feeding device 1 determines whether or not electric power can be supplied to the power receiving device 2 based on the periodic waveform variation in the excited voltage excited in the feeding coil 11, (for example, the peak voltage variation), the periodic waveform variation being detected based on the change in electrical connection state of the resonant capacitor 22, and controls whether or not to continue the supply of the drive signal to the drive transistor 13 based on a result of the determination.

With this, the power feeding method according to the first embodiment exhibits the same effects as those of the power feeding system 100 described above, and can reduce the risk of an erroneous determination about whether or not electric power can be supplied to the power receiving device 2.

Second Embodiment

Next, a power feeding system 100a according to a second embodiment of the present invention is described with reference to the drawings.

Figure 6:
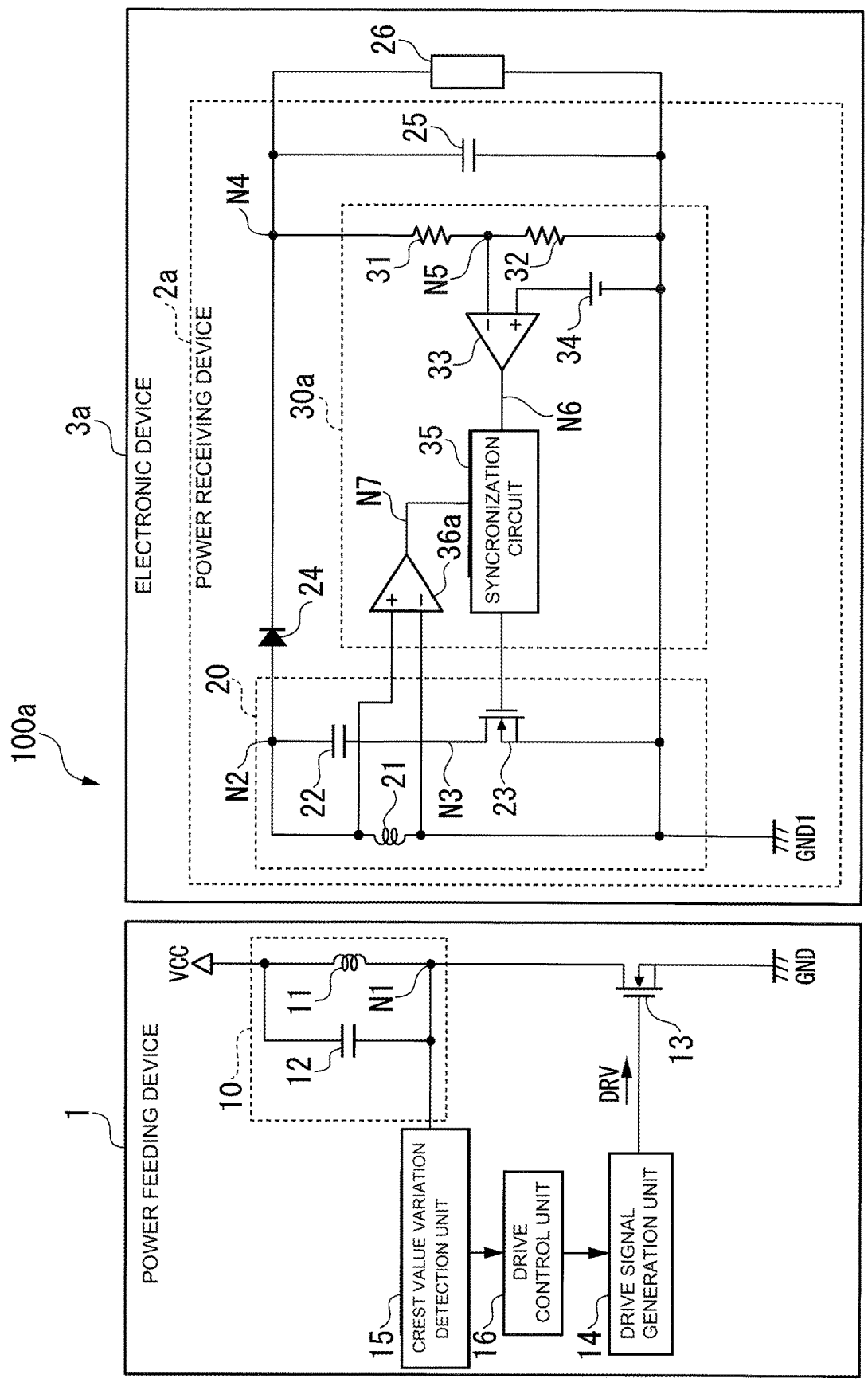
FIG. 6 is a functional block diagram for illustrating an example of a power feeding system according to a second embodiment of the present invention.

FIG. 6 is a functional block diagram for illustrating an example of the power feeding system 100a according to the second embodiment.

As illustrated in FIG. 6, the power feeding system 100a includes a power feeding device 1 and an electronic device 3a including a power receiving device 2a.

In FIG. 6, the same configuration as that of FIG. 1 is denoted by the same reference symbol, and the description thereof is omitted.

In the second embodiment, as an example in which the resonance control transistor 23 is set to the OFF state during the period including the subsequent conducting period estimated in the resonant state of the resonant circuit 20, description is given of a modification example in which the resonance control transistor 23 is set to the OFF state in synchronization with the period during which a current of the receiving coil 21 becomes equal to or less than a predetermined current value.

The power receiving device 2a includes the receiving coil 21, the resonant capacitor 22, the resonance control transistor 23, the rectifying diode 24, the smoothing capacitor 25, and a resonance control unit 30a.

The resonance control unit 30a is configured to control the resonant state of the resonant circuit 20 by controlling the resonance control transistor 23. Further, when setting the resonant circuit 20 to the non-resonant state, the resonance control unit 30a sets the resonance control transistor 23 to the OFF state during the period including the subsequent conducting period during which a current flows to the rectifying diode 24, and is estimated in the resonant state of the resonant circuit 20. For example, when setting the resonant circuit 20 to the non-resonant state, the resonance control unit 30a sets the resonance control transistor 23 to the OFF state in synchronization with a period during which a current of the receiving coil 21 becomes equal to or less than a predetermined current value (for example, 0 A or less). In this case, the current of the receiving coil 21 refers to a current of the receiving coil 21 flowing to the rectifying diode 24.

Specifically, the period during which the current of the receiving coil 21 becomes equal to or less than the predetermined current value (for example, 0 A or less) is, for example, a period during which the resonance control unit 30a sets the resonance control transistor 23 to the OFF state in synchronization with timing at which the current of the receiving coil 21 reaches a minimum value, and sets the resonance control transistor 23 to the ON state after an elapse of the predetermined period after the resonance control transistor 23 is set to the OFF state. That is, the timing at which the current of the receiving coil 21 reaches a minimum value is included in the period during which the current of the receiving coil 21 becomes equal to or less than the predetermined current value (for example, 0 A or less).

The predetermined period in this case is the same as that in the first embodiment described above.

The current of the receiving coil 21 reaches a peak value (maximum value or minimum value) when the voltages at both ends of the receiving coil 21 are equal to each other (the voltage of the receiving coil 21 is 0 V). In this case, the timing at which the current of the receiving coil 21 reaches a minimum value corresponds to timing at which the voltage of the node N2 falls and the voltages at both ends of the receiving coil 21 become equal to each other. In view of the foregoing, the resonance control unit 30a is configured to set the resonance control transistor 23 to the OFF state in synchronization with the timing at which the voltage of the node N2 falls and the voltages at both ends of the receiving coil 21 become equal to each other.

Further, the resonance control unit 30a includes the resistors 31 and 32, comparators 33 and 36a, the synchronization circuit 35, and the reference power supply 34.

The comparator 36a has a positive input terminal and a negative input terminal that are connected to respective ends of the receiving coil 21. That is, the comparator 36a has the positive input terminal connected to the node N2 and the negative input terminal connected to the power supply GND1. The comparator 36a is configured to compare the voltages at both ends of the receiving coil 21 to each other. When the voltage of the receiving coil 21 on the rectifying diode 24 side (voltage of the node N2) is equal to or less than the voltage on the power supply GND1 side, the comparator 36a outputs the L state to the node N7. Meanwhile, when the voltage on the rectifying diode 24 side (voltage of the node N2) is larger than the voltage on the power supply GND1 side, the comparator 36a outputs the H state to the node N7.

The synchronization circuit 35 (example of the signal generation unit) of the second embodiment is configured to generate a control signal based on the output signal of the comparator 33 (signal of the node N6) and an output signal of the comparator 36a (signal of the node N7) to output the control signal to the gate terminal of the resonance control transistor 23. For example, the synchronization circuit 35 sets the resonance control transistor 23 to the OFF state in synchronization with the timing at which the current of the receiving coil 21 reaches a minimum value (timing at which the voltage of the node N2 falls and the voltages at both ends of the receiving coil 21 become equal to each other). Then, the synchronization circuit 35 sets the resonance control transistor 23 to the ON state after an elapse of the predetermined period after the resonance control transistor 23 is set to the OFF state.

Specifically, when the output of the comparator 33 (voltage of the node N6) is set to the L state, the synchronization circuit 35 outputs the L state to the gate terminal of the resonance control transistor 23 in synchronization with fall timing of the output of the comparator 36a (voltage of the node N7). Meanwhile, when the output of the comparator 33 (voltage of the node N6) is in the H state after an elapse of the predetermined period (for example, one cycle of the drive signal DRV), the synchronization circuit 35 outputs the H state to the gate terminal of the resonance control transistor 23.

Next, the operation of the power feeding system 100a according to the second embodiment is described with reference to the drawings.

Figure 7:
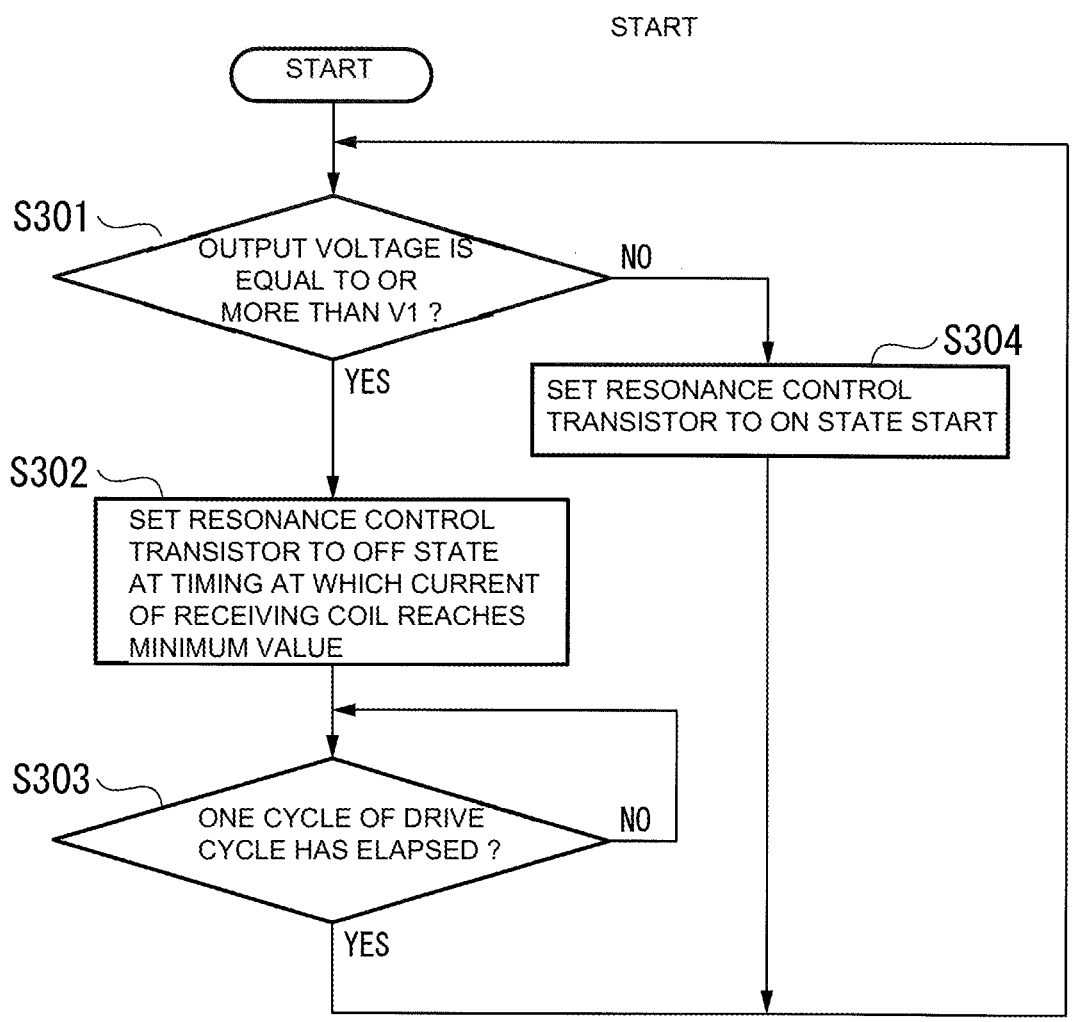
FIG. 7 is a flowchart for illustrating an example of resonance control processing of a power receiving device according to the second embodiment.

FIG. 7 is a flowchart for illustrating an example of resonance control processing of the power receiving device 2a according to the second embodiment.

In FIG. 7, when electric power is supplied wirelessly (in a non-contact manner) from the feeding coil 11 of the power feeding device 1 to the receiving coil 21 of the power receiving device 2a, the power receiving device 2a determines whether or not an output voltage (voltage of the node N4) output through the rectifying diode 24 is equal to or more than the voltage V1 (predetermined threshold value or more) (Step S301). Specifically, the resonance control unit 30a subjects the voltage of the node N4 (output voltage) to voltage division with the resistor 31 and the resistor 32, and the comparator 33 compares the voltage subjected to voltage division (voltage of the node N5) and the output voltage of the reference power supply 34 to each other. With this, it is determined whether or not the voltage of the node N4 (output voltage) is equal to or more than the voltage V1.

When the voltage of the node N4 (output voltage) is equal to or more than the voltage V1 (Step S301: YES), the resonance control unit 30a advances the flow to Step S302. Further, when the voltage of the node N4 (output voltage) is less than the voltage V1 (Step S301: NO), the resonance control unit 30a advances the flow to Step S304.

In Step S302, the resonance control unit 30a sets the resonance control transistor 23 to the OFF state at the timing at which the current of the receiving coil 21 reaches a minimum value. In this case, for example, the resonance control unit 30a sets the resonance control transistor 23 to the OFF state at the timing at which the voltage of the node N2 falls and the voltages at both ends of the receiving coil 21 become equal to each other. That is, when the output of the comparator 33 (voltage of the node N6) is set to the L state, the synchronization circuit 35 outputs the L state to the gate terminal of the resonance control transistor 23 in synchronization with fall timing of the output of the comparator 36a (voltage of the node N7).

The subsequent processing in Step S303 and Step S304 is the same as that in Step S103 and Step S104 illustrated in FIG. 2, and hence description thereof is omitted here.

As described above, in the second embodiment, the synchronization circuit 35 is configured to set the resonance control transistor 23 to the OFF state in synchronization with the period during which the current of the receiving coil 21 becomes equal to or less than the predetermined current value (for example, the period during which the current becomes equal to or less than 0 A), and set the resonance control transistor 23 to the ON state after an elapse of the predetermined period (after an elapse of one cycle of the drive cycle) after the resonance control transistor 23 is set to the OFF state. This operation corresponds to operation in which the resonance control unit 30a sets the resonance control transistor 23 to the OFF state during the period including the subsequent conducting period during which a current flows to the rectifying diode 24, and is estimated in the resonant state of the resonant circuit 20.

Next, a specific example of the resonance control processing of the power receiving device 2a according to the second embodiment is described with reference to FIG. 8.

Figure 8:
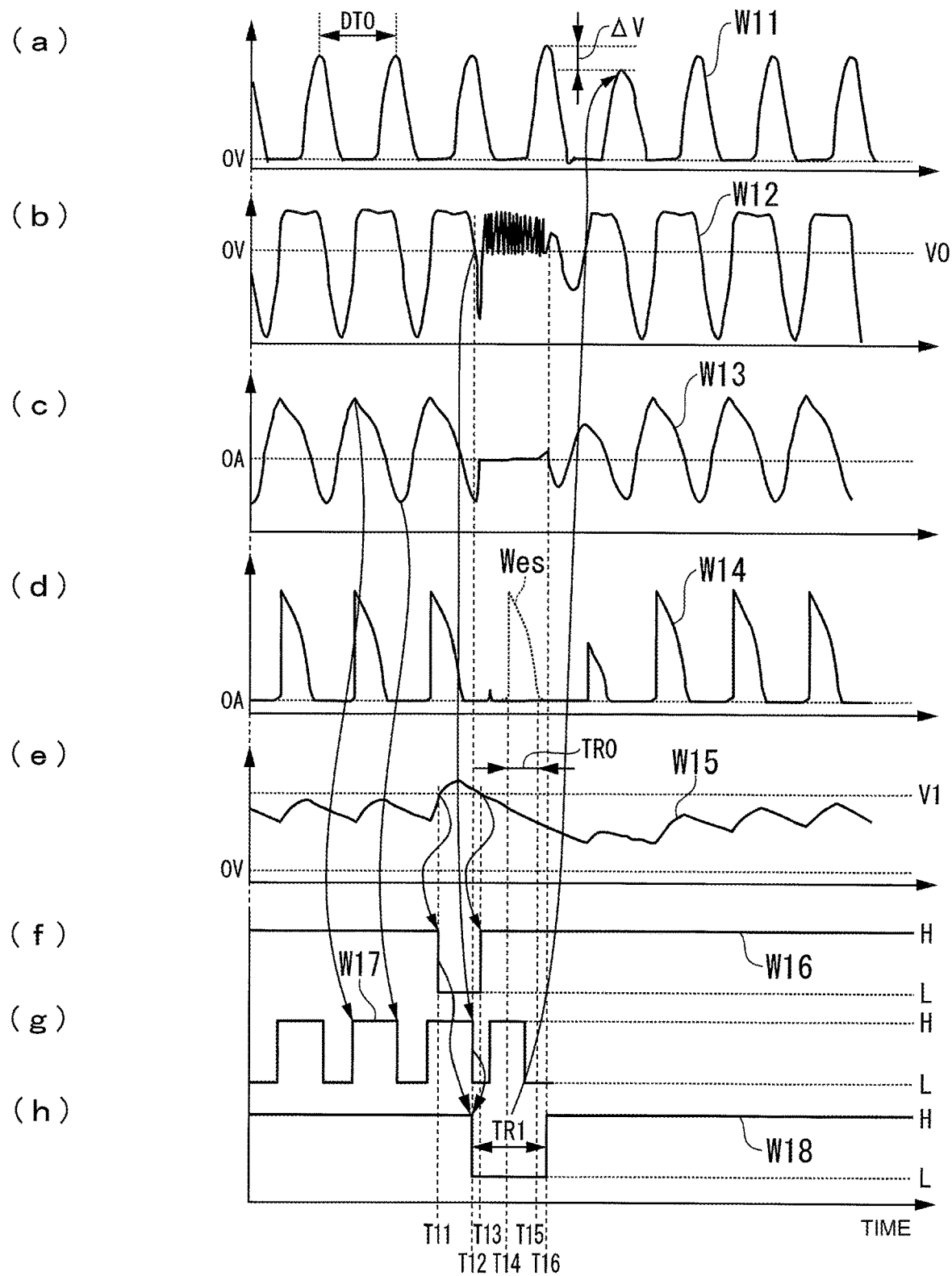
FIG. 8 is a timing chart for illustrating an example of the resonance control processing of the power receiving device according to the second embodiment.

FIG. 8 is a timing chart for illustrating an example of the resonance control processing of the power receiving device 2a according to the second embodiment.

In FIG. 8, waveforms W11 to W18 represent, in the order from above, (a) a voltage of the feeding coil 11 (voltage of the node N1), (b) a voltage of the receiving coil 21 (voltage of the node N2), (c) a current of the receiving coil 21, (d) a current of the rectifying diode 24, (e) an output voltage (load supply voltage), (f) a voltage of the node N6 (output voltage of the comparator 33), (g) a voltage of the node N7 (output voltage of the comparator 36a), and (h) a gate voltage of the resonance control transistor 23. In this case, the current (c) of the receiving coil 21 is a current of the receiving coil 21 flowing to the rectifying diode 24. The vertical axis represents a voltage for the waveforms (a), (b), and (e), a current for the waveforms (c) and (d), and a logic state for the waveforms (f) to (h). The horizontal axis represents time.

Further, in FIG. 8, a waveform Wes of the broken line and a period DT0 are the same as those in FIG. 3.

Further, the comparator 36a compares the voltages at both ends of the receiving coil 21. The comparator 36a changes the node N7 from the L state to the H state when the current of the receiving coil 21 (see the waveform W13) reaches a maximum value, and changes the node N7 from the H state to the L state when the current of the receiving coil 21 reaches a minimum value (see the waveform W17).

Further, when the voltage of the node N4 (see the waveform W15) becomes equal to or more than the voltage V1 at a time T11, the comparator 33 outputs the L state to the node N6. That is, the comparator 33 changes the voltage of the node N6 from the H state to the L state (see the waveform W16).

Next, when the voltage of the receiving coil 21 on the rectifying diode 24 side (voltage of the node N2) falls to become equal to that of the power supply GND1 (see the waveform W12) at a time T12, the comparator 36a outputs the L state to the node N7. That is, the comparator 36a changes the voltage of the node N7 from the H state to the L state (see the waveform W17). The synchronization circuit 35 sets the gate voltage of the resonance control transistor 23 to the L state in synchronization with fall timing of the node N7 from the H state to the L state (see the waveform W18). With this, the resonance control transistor 23 is set to the OFF state, and the resonant circuit 20 is set to the non-resonant state.

Meanwhile, when the voltage of the node N6 (see the waveform W15) becomes less than the voltage V1 at a time T13, the comparator 33 outputs the H state to the node N6. That is, the comparator 33 changes the voltage of the node N6 from the L state to the H state (see the waveform W16).

Further, the synchronization circuit 35 waits for an elapse of the period TR0 based on the drive cycle DT0. When the voltage of the node N6 is in the H state at a time T16, the synchronization circuit 35 sets the gate voltage of the resonance control transistor 23 to the H state (see the waveform W18). With this, the resonance control transistor 23 is set to the ON state, and the resonant circuit 20 is set to the resonant state again.

The operation from a time T14 to the time T16 is the same as that from the time T4 to the time T6 illustrated in FIG. 3, and hence description thereof is omitted here.

As represented by the waveform W14, in the resonance control processing of the power receiving device 2a according to the second embodiment, the waveform Wes is not generated in the current of the rectifying diode 24, and the current of the receiving coil 21 decreases. This decrease in current is transmitted from the receiving coil 21 to the feeding coil 11, and a waveform variation, in which a peak voltage value decreases by the voltage difference ΔV, occurs in the voltage of the feeding coil 11 (voltage of the node N1).

In the above-mentioned example, description is given of an example in which the resonance control unit 30a sets the resonance control transistor 23 to the OFF state in synchronization with the timing at which the current of the receiving coil 21 reaches a minimum value as an example of the period during which the current of the receiving coil 21 becomes equal to or less than the predetermined current value. However, for example, the resonance control unit 30a may set the resonance control transistor 23 to the OFF state in synchronization with a period during which the current of the receiving coil 21 becomes a negative value.

Further, the drive control processing of the power feeding device 1 according to the second embodiment is the same as that of the first embodiment illustrated in FIG. 4 and FIG. 5, and hence description thereof is omitted here.

As described above, the power feeding system 100a according to the second embodiment includes the power feeding device 1 and the power receiving device 2a. The power receiving device 2a includes the resonant circuit 20, the rectifying diode 24, and the resonance control unit 30a. The resonance control unit 30a is configured to set the resonance control transistor 23 to the OFF state in synchronization with the period during which the current of the receiving coil 21 flowing to the rectifying diode 24 becomes equal to or less than the predetermined current value (for example, 0 A or less), and set the resonance control transistor 23 to the ON state after an elapse of the predetermined period (for example, after an elapse of the period TR1) after the resonance control transistor 23 is set to the OFF state.

With this, the power feeding system 100a according to the second embodiment exhibits the same effects as those of the first embodiment described above, and can reduce the risk of an erroneous determination about whether or not electric power can be supplied to the power receiving device 2a. Further, the power feeding system 100a according to the second embodiment can reduce the risk of an erroneous determination about whether or not electric power can be supplied to the power receiving device 2a with simple means for detecting the period during which the current of the receiving coil 21 becomes equal to or less than the predetermined current value (for example, 0 A or less).

Further, in the second embodiment, the resonance control unit 30a is configured to set the resonance control transistor 23 to the OFF state in synchronization with the timing at which the current of the receiving coil 21 flowing to the rectifying diode 24 reaches a minimum value, and set the resonance control transistor 23 to the ON state after an elapse of the predetermined period (for example, after an elapse of the period TR1) after the resonance control transistor 23 is set to the OFF state.

With this, the timing at which the current of the receiving coil 21 reaches a minimum value corresponds to the timing at which the voltage of the receiving coil 21 (voltage of the node N2) falls and the voltages at both ends of the receiving coil 21 become equal to each other, and hence the power feeding system 100a according to the second embodiment can reduce the risk of an erroneous determination about whether or not electric power can be supplied to the power receiving device 2a with simple means for detecting the timing at which the voltages at both ends of the receiving coil 21 become equal to each other.

Third Embodiment

Next, a power feeding system 100b according to a third embodiment of the present invention is described with reference to the drawings.

Figure 9:
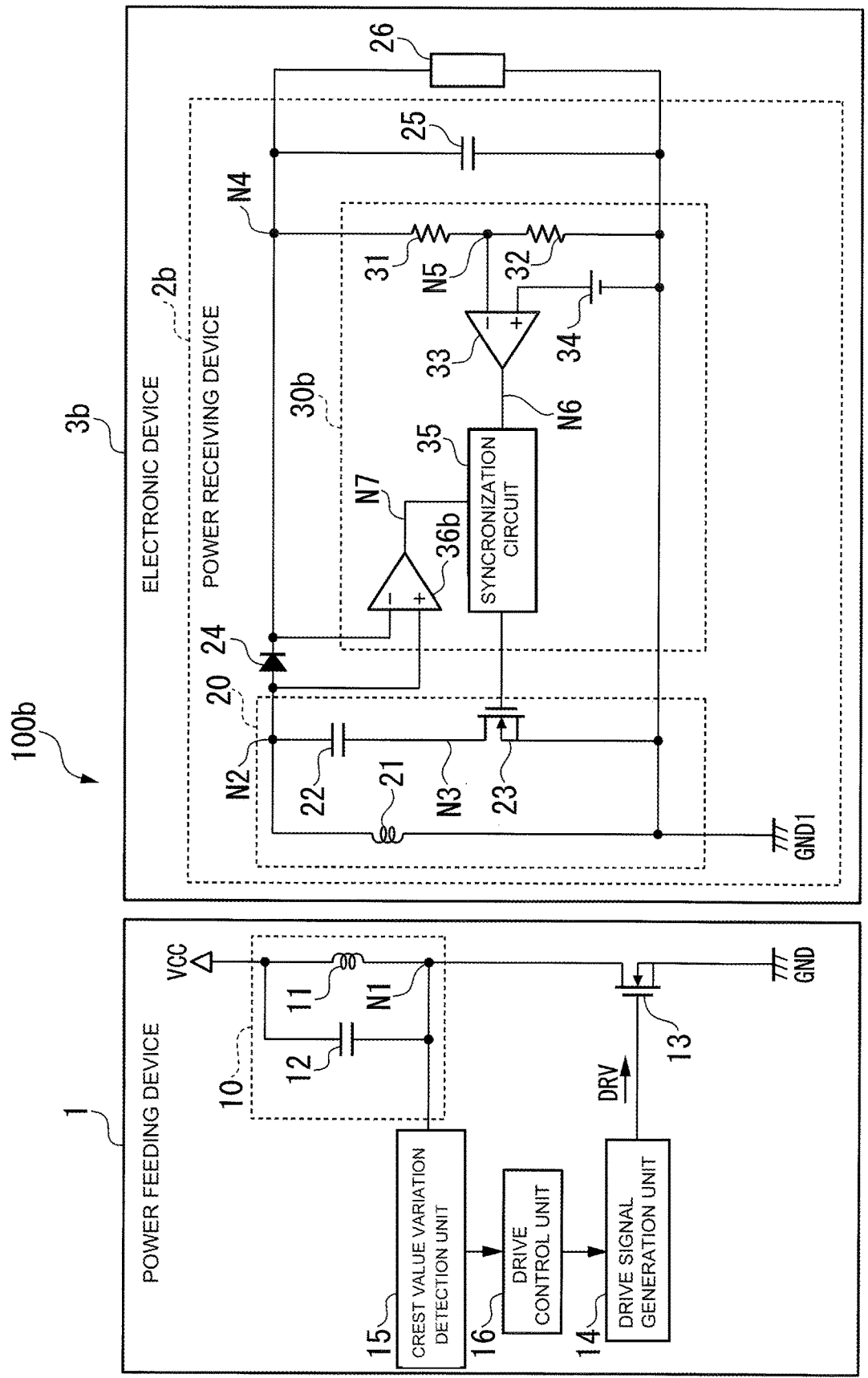
FIG. 9 is a functional block diagram for illustrating an example of a power feeding system according to a third embodiment of the present invention.

FIG. 9 is a functional block diagram for illustrating an example of the power feeding system 100b according to the third embodiment.

As illustrated in FIG. 9, the power feeding system 100a includes a power feeding device 1 and an electronic device 3b including a power receiving device 2b.

In FIG. 9, the same configuration as that of FIG. 1 is denoted by the same reference symbol, and the description thereof is omitted.

In the third embodiment, as an example in which the resonance control transistor 23 is set to the OFF state during the period including the subsequent conducting period estimated in the resonant state of the resonant circuit 20, description is given of a modification example in which the resonance control transistor 23 is set to the OFF state in synchronization with timing at which the voltage of the anode terminal of the rectifying diode 24 and the voltage of the cathode terminal of the rectifying diode 24 become equal to each other.

The power receiving device 2b includes the receiving coil 21, the resonant capacitor 22, the resonance control transistor 23, the rectifying diode 24, the smoothing capacitor 25, and a resonance control unit 30b.

The resonance control unit 30b is configured to control the resonant state of the resonant circuit 20 by controlling the resonance control transistor 23. Further, when setting the resonant circuit 20 to the non-resonant state, the resonance control unit 30b sets the resonance control transistor 23 to the OFF state during the period including the subsequent conducting period during which a current flows to the rectifying diode 24, and is estimated in the resonant state of the resonant circuit 20. For example, when setting the resonant circuit 20 to the non-resonant state, the resonance control unit 30b sets the resonance control transistor 23 to the OFF state in synchronization with the timing at which the voltage of the anode terminal of the rectifying diode 24 and the voltage of the cathode terminal of the rectifying diode 24 become equal to each other.

Specifically, the timing at which the voltage of the anode terminal of the rectifying diode 24 and the voltage of the cathode terminal of the rectifying diode 24 become equal to each other is, for example, a period during which the resonance control unit 30b sets the resonance control transistor 23 to the OFF state in synchronization with the timing at which the voltage of the anode terminal of the rectifying diode 24 becomes equal to or less than the voltage of the cathode terminal of the rectifying diode 24, and sets the resonance control transistor 23 to the ON state after an elapse of the predetermined period after the resonance control transistor 23 is set to the OFF state. There are given the following two kinds of timing as the timing at which the voltage of the anode terminal of the rectifying diode 24 and the voltage of the cathode terminal of the rectifying diode 24 become equal to each other: timing at which the voltage of the anode terminal of the rectifying diode 24 and the voltage of the cathode terminal of the rectifying diode 24 become equal to each other when the voltage of the anode terminal becomes equal to or more than the voltage of the cathode terminal; and timing at which the voltage of the anode terminal of the rectifying diode 24 and the voltage of the cathode terminal of the rectifying diode 24 become equal to each other when the voltage of the anode terminal becomes equal to or less than the voltage of the cathode terminal. That is, the timing at which the voltage of the anode terminal of the rectifying diode 24 becomes equal to or less than the voltage of the cathode terminal of the rectifying diode 24 is included in the timing at which the voltage of the anode terminal of the rectifying diode 24 and the voltage of the cathode terminal of the rectifying diode 24 become equal to each other.

The predetermined period in this case is the same as that of the first embodiment described above. Further, the timing at which the voltage of the anode terminal of the rectifying diode 24 becomes equal to or less than the voltage of the cathode terminal of the rectifying diode 24 refers to the timing at which the voltage of the node N2 falls to become equal to the voltage of the node N4. In view of the foregoing, the resonance control unit 30b is configured to set the resonance control transistor 23 to the OFF state in synchronization with the timing at which the voltage of the node N2 falls to become equal to the voltage of the node N4.

Further, the resonance control unit 30b includes the resistors 31 and 32, comparators 33 and 36b, the synchronization circuit 35, and the reference power supply 34.

The comparator 36b has a positive input terminal connected to the anode terminal of the rectifying diode 24 (node N2) and a negative input terminal connected to the cathode terminal of the rectifying diode 24 (node N4). The comparator 36b is configured to compare the voltages at both ends of the rectifying diode 24 to each other. When the voltage of the anode terminal (node N2) is equal to or less than the voltage of the cathode terminal (node N4), the comparator 36b outputs the L state to the node N7. Meanwhile, when the voltage of the anode terminal (node N2) is larger than the voltage of the cathode terminal (node N4), the comparator 36b outputs the H state to the node N7.

The synchronization circuit 35 (example of the signal generation unit) of the third embodiment is configured to generate a control signal based on the output signal of the comparator 33 (signal of the node N6) and an output signal of the comparator 36b (signal of the node N7) to output the control signal to the gate terminal of the resonance control transistor 23. For example, the synchronization circuit 35 sets the resonance control transistor 23 to the OFF state in synchronization with the timing at which the voltage of the anode terminal of the rectifying diode 24 (node N2) falls to become equal to the voltage of the cathode terminal of the rectifying diode 24 (node N4). Then, the synchronization circuit 35 sets the resonance control transistor 23 to the ON state after an elapse of the predetermined period after the resonance control transistor 23 is set to the OFF state.

Specifically, when the output of the comparator 33 (voltage of the node N6) is set to the L state, the synchronization circuit 35 outputs the L state to the gate terminal of the resonance control transistor 23 in synchronization with fall timing of the output of the comparator 36b (voltage of the node N7). Meanwhile, when the output of the comparator 33 (voltage of the node N6) is in the H state after an elapse of the predetermined period (for example, one cycle of the drive signal DRV), the synchronization circuit 35 outputs the H state to the gate terminal of the resonance control transistor 23.

Next, the operation of the power feeding system 100b according to the third embodiment is described with reference to the drawings.

Figure 10:
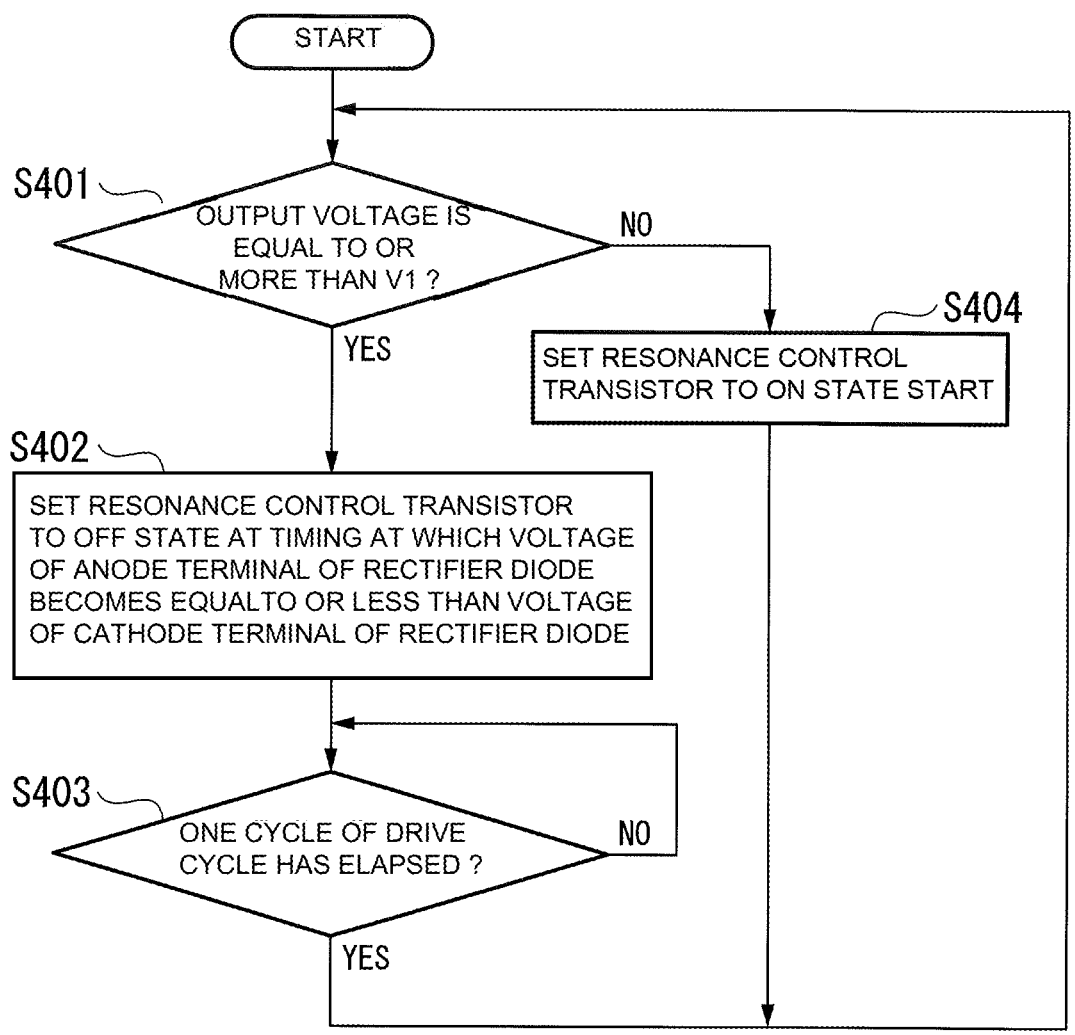
FIG. 10 is a flowchart for illustrating an example of resonance control processing of a power receiving device according to the third embodiment.

FIG. 10 is a flowchart for illustrating an example of resonance control processing of the power receiving device 2b according to the third embodiment.

In FIG. 10, when electric power is supplied wirelessly (in a non-contact manner) from the feeding coil 11 of the power feeding device 1 to the receiving coil 21 of the power receiving device 2b, the power receiving device 2b determines whether or not an output voltage (voltage of the node N4) output through the rectifying diode 24 is equal to or more than the voltage V1 (predetermined threshold value or more) (Step S401). Specifically, the resonance control unit 30b subjects the voltage of the node N4 (output voltage) to voltage division with the resistor 31 and the resistor 32, and the comparator 33 compares the voltage subjected to voltage division (voltage of the node N5) and the output voltage of the reference power supply 34 to each other. With this, it is determined whether or not the voltage of the node N4 (output voltage) is equal to or more than the voltage V1.

When the voltage of the node N4 (output voltage) is equal to or more than the voltage V1 (Step S401: YES), the resonance control unit 30b advances the flow to Step S402. Further, when the voltage of the node N4 (output voltage) is less than the voltage V1 (Step S401: NO), the resonance control unit 30b advances the flow to Step S403.

In Step S402, the resonance control unit 30b sets the resonance control transistor 23 to the OFF state at the timing at which the voltage of the anode terminal of the rectifying diode 24 becomes equal to or less than the voltage of the cathode terminal of the rectifying diode 24. In this case, for example, the resonance control unit 30b sets the resonance control transistor 23 to the OFF state at the timing at which the voltage of the anode terminal of the rectifying diode 24 (node N2) falls to become equal to the voltage of the cathode terminal of the rectifying diode 24 (node N4). That is, when the output of the comparator 33 (voltage of the node N6) is set to the L state, the synchronization circuit 35 outputs the L state to the gate terminal of the resonance control transistor 23 in synchronization with fall timing of the output of the comparator 36b (voltage of the node N7).

The subsequent processing in Step S403 and Step S404 is the same as that in Step S103 and Step S104 illustrated in FIG. 2, and hence description thereof is omitted here.

As described above, in the third embodiment, the synchronization circuit 35 is configured to set the resonance control transistor 23 to the OFF state in synchronization with the timing at which the voltage of the anode terminal of the rectifying diode 24 (node N2) falls to become equal to the voltage of the cathode terminal of the rectifying diode 24 (node N4), and set the resonance control transistor 23 to the ON state after an elapse of the predetermined period (after an elapse of one cycle of the drive cycle) after the resonance control transistor 23 is set to the OFF state. This operation corresponds to operation in which the resonance control unit 30b sets the resonance control transistor 23 to the OFF state during the period including the subsequent conducting period during which a current flows to the rectifying diode 24, and is estimated in the resonant state of the resonant circuit 20.

Next, a specific example of the resonance control processing of the power receiving device 2b according to the third embodiment is described with reference to FIG. 11.

Figure 11:
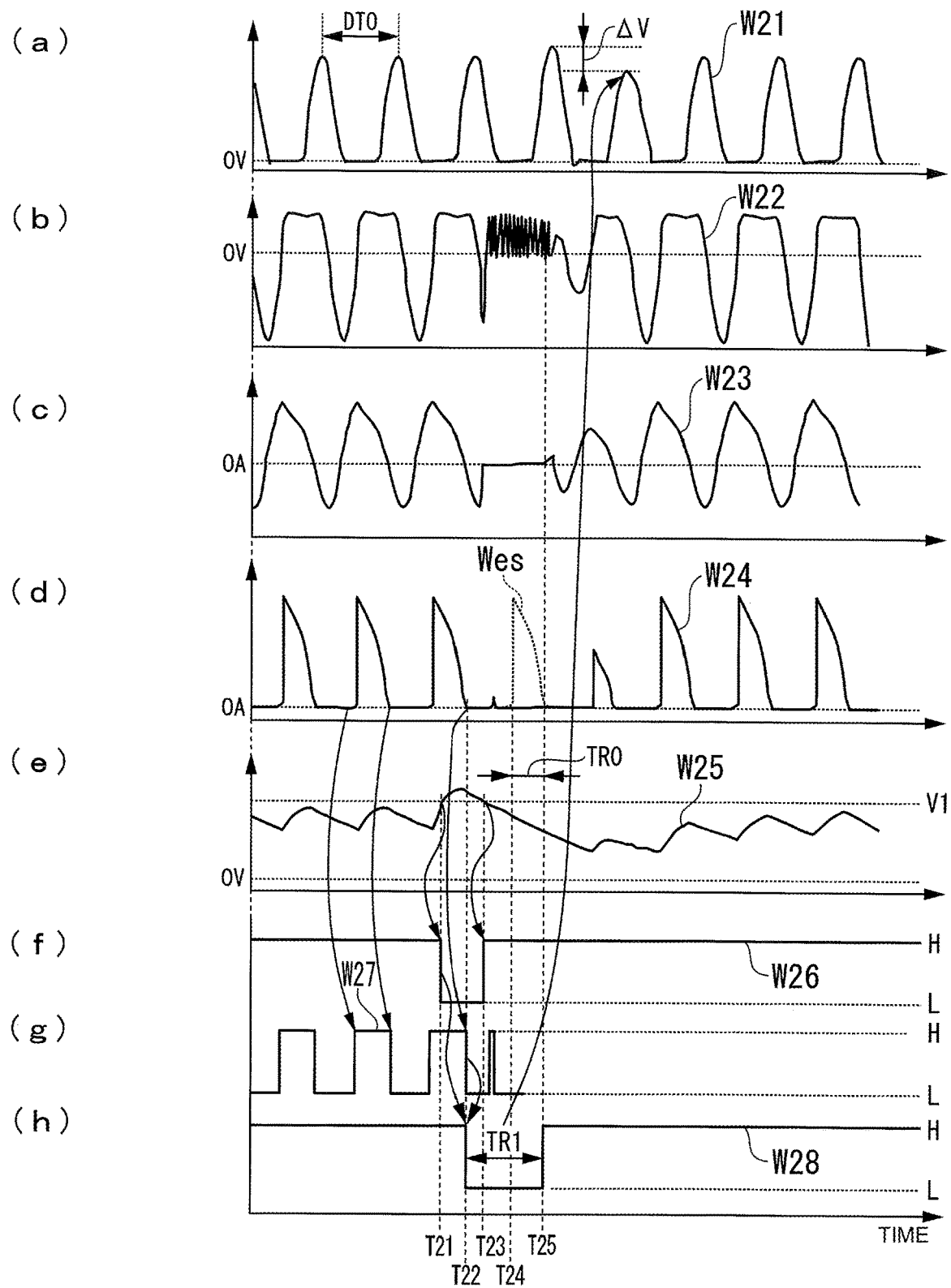
FIG. 11 is a timing chart for illustrating an example of the resonance control processing of the power receiving device according to the third embodiment.

FIG. 11 is a timing chart for illustrating an example of the resonance control processing of the power receiving device 2b according to the third embodiment.

In FIG. 11, waveforms W21 to W28 represent, in the order from above, (a) a voltage of the feeding coil 11 (voltage of the node N1), (b) a voltage of the receiving coil 21 (voltage of the node N2), (c) a current of the receiving coil 21, (d) a current of the rectifying diode 24, (e) an output voltage (load supply voltage), (f) a voltage of the node N6 (output voltage of the comparator 33), (g) a voltage of the node N7 (output voltage of the comparator 36b), and (h) a gate voltage of the resonance control transistor 23. In this case, the current (c) of the receiving coil 21 is a current of the receiving coil 21 flowing to the rectifying diode 24. The vertical axis represents a voltage for the waveforms (a), (b), and (e), a current for the waveforms (c) and (d), and a logic state for the waveforms (f) to (h). The horizontal axis represents time.

Further, in FIG. 11, a waveform Wes of the broken line and a period DT0 are the same as those in FIG. 3.

Further, the comparator 36b compares the voltages at both ends of the rectifying diode 24. The comparator 36b outputs the H state to the node N7 when the voltage of the anode terminal (node N2) becomes larger than the voltage of the cathode terminal (node N4), and outputs the L state to the node N7 when the voltage of the anode terminal (node N2) is equal to or less than the voltage of the cathode terminal (node N4) (see the waveform W27). The period during which the node N7 is in the H state corresponds to a period including the conducting period of the rectifying diode 24.

Further, when the voltage of the node N6 (see the waveform W25) becomes equal to or more than the voltage V1 at a time T21, the comparator 33 outputs the L state to the node N6. That is, the comparator 33 changes the voltage of the node N6 from the H state to the L state (see the waveform W26).

Next, when the voltage of the anode terminal of the rectifying diode 24 (node N2) falls to become equal to the voltage of the cathode terminal of the rectifying diode 24 (node N4) at a time T22, the comparator 36b outputs the L state to the node N7. That is, the comparator 36b changes the voltage of the node N7 from the H state to the L state (see the waveform W27). The synchronization circuit 35 sets the gate voltage of the resonance control transistor 23 to the L state in synchronization with fall timing of the node N7 from the H state to the L state (see the waveform W28). With this, the resonance control transistor 23 is set to the OFF state, and the resonant circuit 20 is set to the non-resonant state.

Meanwhile, when the voltage of the node N6 (see the waveform W25) becomes less than the voltage V1 at a time T23, the comparator 33 outputs the H state to the node N6. That is, the comparator 33 changes the voltage of the node N6 from the L state to the H state (see the waveform W26).

Further, the synchronization circuit 35 waits for an elapse of the period TR0 based on the drive cycle DT0. When the voltage of the node N6 is in the H state at a time T26, the synchronization circuit 35 sets the gate voltage of the resonance control transistor 23 to the H state (see the waveform W28). With this, the resonance control transistor 23 is set to the ON state, and the resonant circuit 20 is set to the resonant state again.

The operation from a time T24 to the time T26 is the same as that from the time T4 to the time T6 illustrated in FIG. 3, and hence description thereof is omitted here.

As represented by the waveform W24, in the resonance control processing of the power receiving device 2b according to the third embodiment, the waveform Wes is not generated in the current of the rectifying diode 24, and the current of the receiving coil 21 decreases. This decrease in current is transmitted from the receiving coil 21 to the feeding coil 11, and a waveform variation, in which a peak voltage value decreases by the voltage difference ΔV, occurs in the voltage of the feeding coil 11 (voltage of the node N1).

Further, the drive control processing of the power feeding device 1 according to the third embodiment is the same as that of the first embodiment illustrated in FIG. 4 and FIG. 5, and hence description thereof is omitted here.

As described above, the power feeding system 100b according to the third embodiment includes the power feeding device 1 and the power receiving device 2b. The power receiving device 2b includes the resonant circuit 20, the rectifying diode 24, and the resonance control unit 30b. The resonance control unit 30b is configured to set the resonance control transistor 23 to the OFF state in synchronization with the timing at which the voltage of the anode terminal of the rectifying diode 24 and the voltage of the cathode terminal of the rectifying diode 24 become equal to each other, and set the resonance control transistor 23 to the ON state after an elapse of the predetermined period (for example, after an elapse of the period TR1) after the resonance control transistor 23 is set to the OFF state.

With this, the power feeding system 100b according to the third embodiment exhibits the same effects as those of the first embodiment described above, and can reduce the risk of an erroneous determination about whether or not electric power can be supplied to the power receiving device 2b. Further, the power feeding system 100b according to the third embodiment can reduce the risk of an erroneous determination about whether or not electric power can be supplied to the power receiving device 2b with simple means for comparing the voltages at both ends of the rectifying diode 24.

Further, in the third embodiment, the resonance control unit 30b is configured to set the resonance control transistor 23 to the OFF state in synchronization with the timing at which the voltage of the anode terminal of the rectifying diode 24 becomes equal to or less than the voltage of the cathode terminal of the rectifying diode 24, and set the resonance control transistor 23 to the ON state after an elapse of the predetermined period (for example, after an elapse of the period TR1) after the resonance control transistor 23 is set to the OFF state.

With this, the power feeding system 100b according to the third embodiment can reduce the risk of an erroneous determination about whether or not electric power can be supplied to the power receiving device 2b with simple means for detecting the timing at which the voltage of the receiving coil 21 (voltage of the node N2) falls and the voltages at both ends of the receiving coil 21 become equal to each other.

Fourth Embodiment

Next, a power feeding system 100c according to a fourth embodiment of the present invention is described with reference to the drawings.

Figure 12:
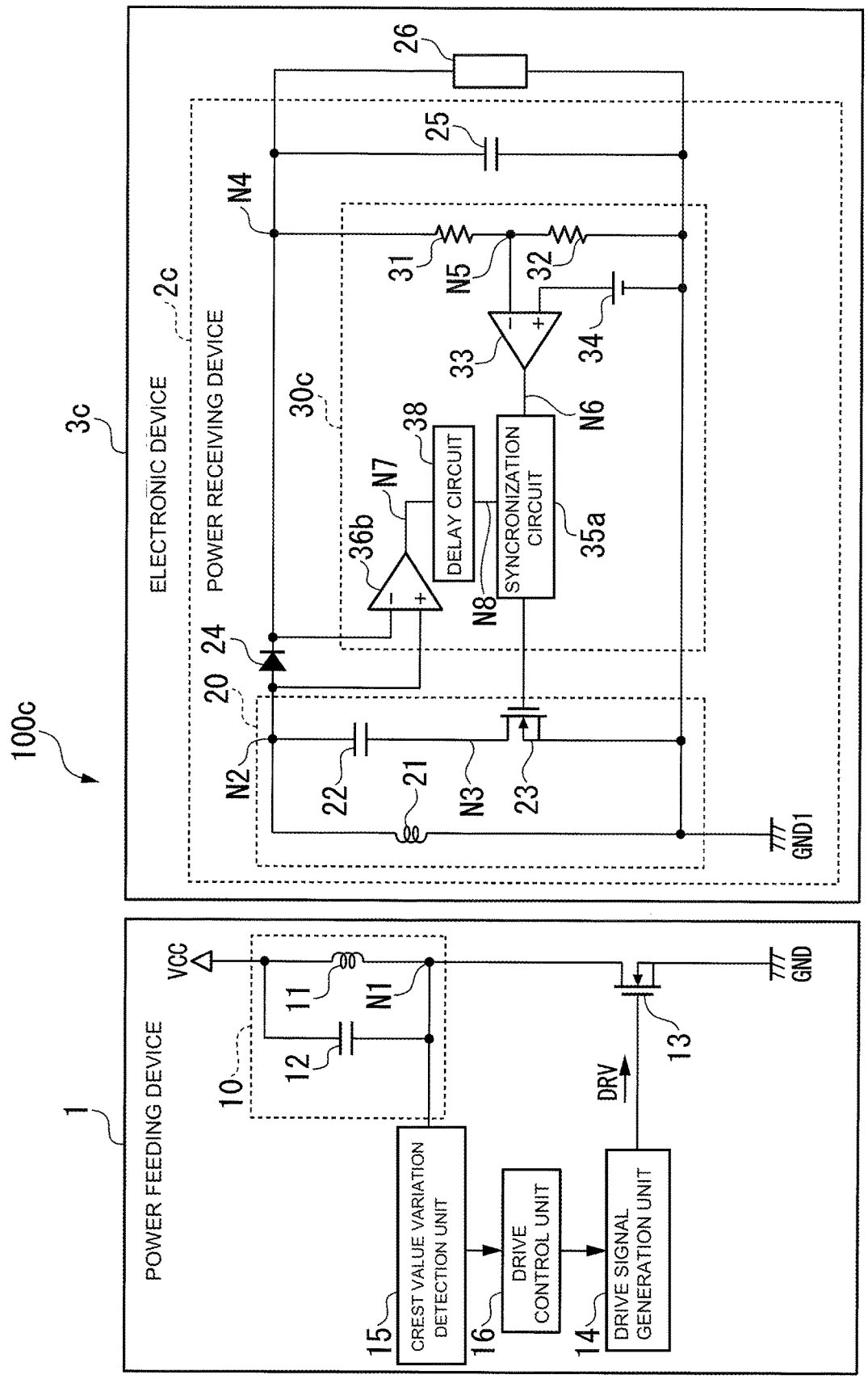
FIG. 12 is a functional block diagram for illustrating an example of a power feeding system according to a fourth embodiment of the present invention.

FIG. 12 is a functional block diagram for illustrating an example of the power feeding system 100 c according to the fourth embodiment.

As illustrated in FIG. 12, the power feeding system 100a includes a power feeding device 1 and an electronic device 3c including a power receiving device 2c.

In FIG. 12, the same configuration as that of FIG. 1 is denoted by the same reference symbol, and the description thereof is omitted.

In the fourth embodiment, as an example in which the resonance control transistor 23 is set to the OFF state during the period including the subsequent conducting period estimated in the resonant state of the resonant circuit 20, description is given of another modification example in which the resonance control transistor 23 is set to the OFF state in synchronization with the timing at which the voltage of the anode terminal of the rectifying diode 24 and the voltage of the cathode terminal of the rectifying diode 24 become equal to each other. In the fourth embodiment, description is given of the case in which, as an example of the timing at which the voltage of the anode terminal of the rectifying diode 24 and the voltage of the cathode terminal of the rectifying diode 24 become equal to each other, the timing at which the voltage of the anode terminal of the rectifying diode 24 becomes equal to or more than the voltage of the cathode terminal of the rectifying diode 24 is used.

The power receiving device 2c includes the receiving coil 21, the resonant capacitor 22, the resonance control transistor 23, the rectifying diode 24, the smoothing capacitor 25, and a resonance control unit 30c.

The resonance control unit 30c is configured to control the resonant state of the resonant circuit 20 by controlling the resonance control transistor 23. Further, when setting the resonant circuit 20 to the non-resonant state, the resonance control unit 30c sets the resonance control transistor 23 to the OFF state during the period including the subsequent conducting period during which a current flows to the rectifying diode 24, and is estimated in the resonant state of the resonant circuit 20. For example, when setting the resonant circuit 20 to the non-resonant state, the resonance control unit 30c sets the resonance control transistor 23 to the OFF state in synchronization with the timing at which the voltage of the anode terminal of the rectifying diode 24 and the voltage of the cathode terminal of the rectifying diode 24 become equal to each other.

Specifically, the resonance control unit 30c is configured to set the resonance control transistor 23 to the OFF state at timing delayed by a period shorter than one cycle of the drive signal DRV from the timing at which the voltage of the anode terminal of the rectifying diode 24 becomes equal to or more than the voltage of the cathode terminal of the rectifying diode 24, and set the resonance control transistor 23 to the ON state after an elapse of a predetermined period after the resonance control transistor 23 is set to the OFF state. The predetermined period in this case is the same as that of the first embodiment described above. Further, the timing at which the voltage of the anode terminal of the rectifying diode 24 becomes equal to or more than the voltage of the cathode terminal of the rectifying diode 24 refers to timing at which the voltage of the node N2 rises to become equal to the voltage of the node N4. In view of the foregoing, the resonance control unit 30c is configured to set the resonance control transistor 23 to the OFF state in synchronization with the timing at which the voltage of the node N2 rises to become equal to the voltage of the node N4 (timing at which the voltage of the node N2 becomes equal to or more than the voltage of the node N4). The expression "in synchronization with the timing" as used herein also encompasses delaying the timing for synchronization by a predetermined delay time (period shorter than one cycle of the drive signal DRV).

Further, the resonance control unit 30c includes the resistors 31 and 32, the comparators 33 and 36b, a synchronization circuit 35a, the reference power supply 34, and a delay circuit 38.

For example, the delay circuit 38 is configured to output a signal obtained by delaying the output signal of the comparator 36b by the period shorter than one cycle of the drive signal DRV to the node N8.

The synchronization circuit 35a (example of the signal generation unit) is configured to generate a control signal based on the output signal of the comparator 33 (signal of the node N6) and the output signal of the delay circuit 38 (signal of the node N8) to output the control signal to the gate terminal of the resonance control transistor 23. When the output of the comparator 33 (voltage of the node N6) is set to the L state, the synchronization circuit 35a outputs the L state to the gate terminal of the resonance control transistor 23 in synchronization with rise timing of the output of the delay circuit 38 (voltage of the node N8). Meanwhile, when the output of the comparator 33 (voltage of the node N6) is in the H state after an elapse of the predetermined period (for example, one cycle of the drive signal DRV), the synchronization circuit 35a outputs the H state to the gate terminal of the resonance control transistor 23.

Next, the operation of the power feeding system 100c according to the fourth embodiment is described with reference to the drawings.

Figure 13:
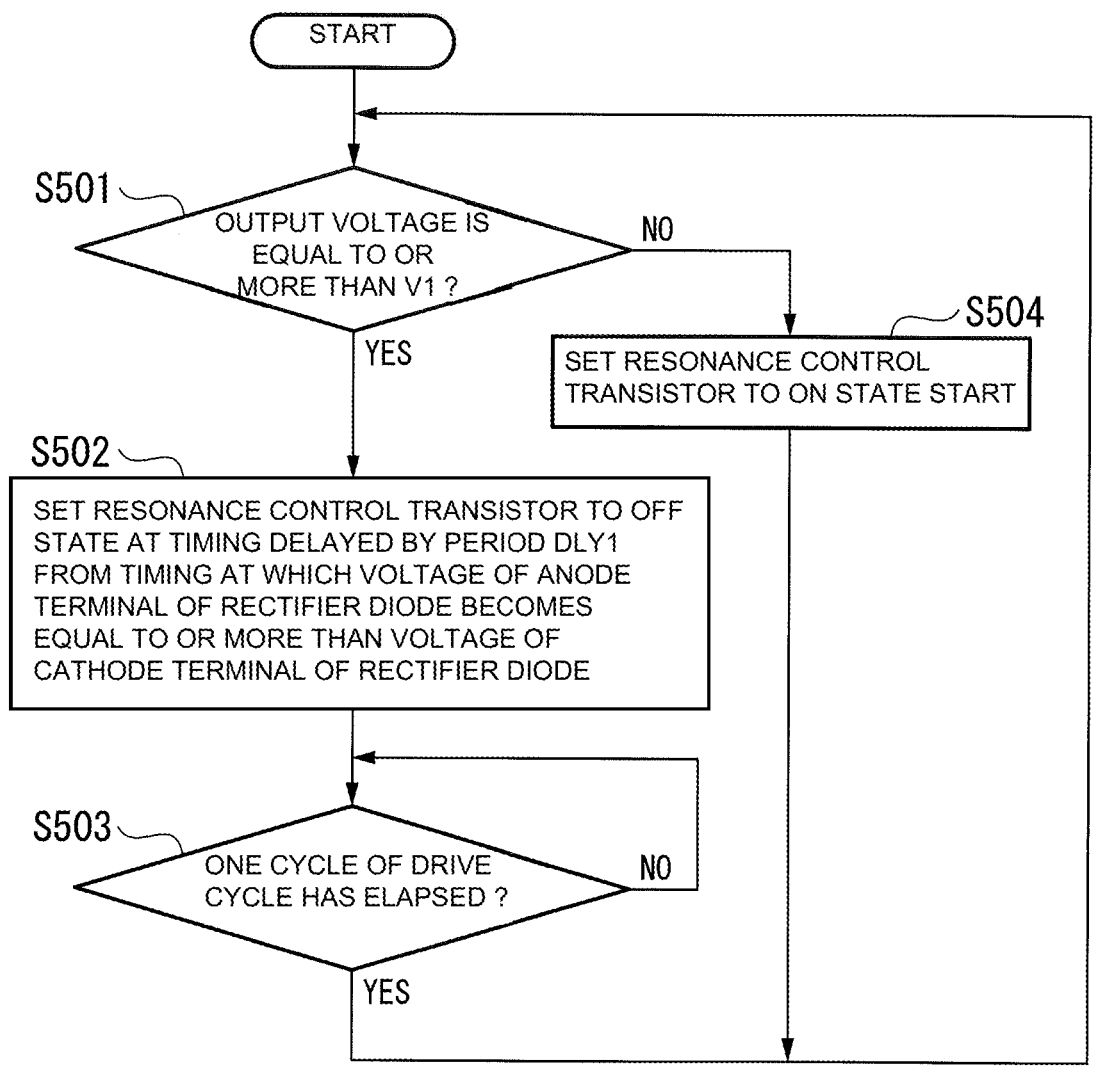
FIG. 13 is a flowchart for illustrating an example of resonance control processing of a power receiving device according to the fourth embodiment.

FIG. 13 is a flowchart for illustrating an example of resonance control processing of the power receiving device 2c according to the fourth embodiment.

In FIG. 13, when electric power is supplied wirelessly (in a non-contact manner) from the feeding coil 11 of the power feeding device 1 to the receiving coil 21 of the power receiving device 2c, the power receiving device 2c determines whether or not an output voltage (voltage of the node N4) output through the rectifying diode 24 is equal to or more than the voltage V1 (predetermined threshold value or more) (Step S501). Specifically, the resonance control unit 30c subjects the voltage of the node N4 (output voltage) to voltage division with the resistor 31 and the resistor 32, and the comparator 33 compares the voltage subjected to voltage division (voltage of the node N5) and the output voltage of the reference power supply 34 to each other. With this, it is determined whether or not the voltage of the node N4 (output voltage) is equal to or more than the voltage V1.

When the voltage of the node N4 (output voltage) is equal to or more than the voltage V1 (Step S501: YES), the resonance control unit 30c advances the flow to Step S502. Further, when the voltage of the node N4 (output voltage) is less than the voltage V1 (Step S501: NO), the resonance control unit 30c advances the flow to Step S504.

In Step S502, the resonance control unit 30c sets the resonance control transistor 23 to the OFF state at timing delayed by a delay time DLY1 (predetermined delay time) from the timing at which the voltage of the anode terminal of the rectifying diode 24 becomes equal to or more than the voltage of the cathode terminal of the rectifying diode 24. For example, the resonance control unit 30c sets the resonance control transistor 23 to the OFF state at timing delayed by the delay time DLY1 from the timing at which the voltage of the anode terminal of the rectifying diode 24 (node N2) rises to become equal to the voltage of the cathode terminal of the rectifying diode 24 (node N4). That is, when the output of the comparator 33 (voltage of the node N6) is set to the L state, the synchronization circuit 35a outputs the L state to the gate terminal of the resonance control transistor 23 in synchronization with rise timing of the output of the delay circuit 38 (voltage of the node N8).

The subsequent processing in Step S503 and Step S504 is the same as that in Step S103 and Step S104 illustrated in FIG. 2, and hence description thereof is omitted here.

As described above, in the fourth embodiment, the synchronization circuit 35a is configured to set the resonance control transistor 23 to the OFF state at the timing delayed by the delay time DLY1 from the timing at which the voltage of the anode terminal of the rectifying diode 24 (node N2) rises to become equal to the voltage of the cathode terminal of the rectifying diode 24 (node N4), and set the resonance control transistor 23 to the ON state after an elapse of the predetermined period (after an elapse of one cycle of the drive cycle) after the resonance control transistor 23 is set to the OFF state. This operation corresponds to operation in which the resonance control unit 30c sets the resonance control transistor 23 to the OFF state during the period including the subsequent conducting period during which a current flows to the rectifying diode 24, and is estimated in the resonant state of the resonant circuit 20.

Next, a specific example of the resonance control processing of the power receiving device 2c according to the fourth embodiment is described with reference to FIG. 14.

Figure 14:
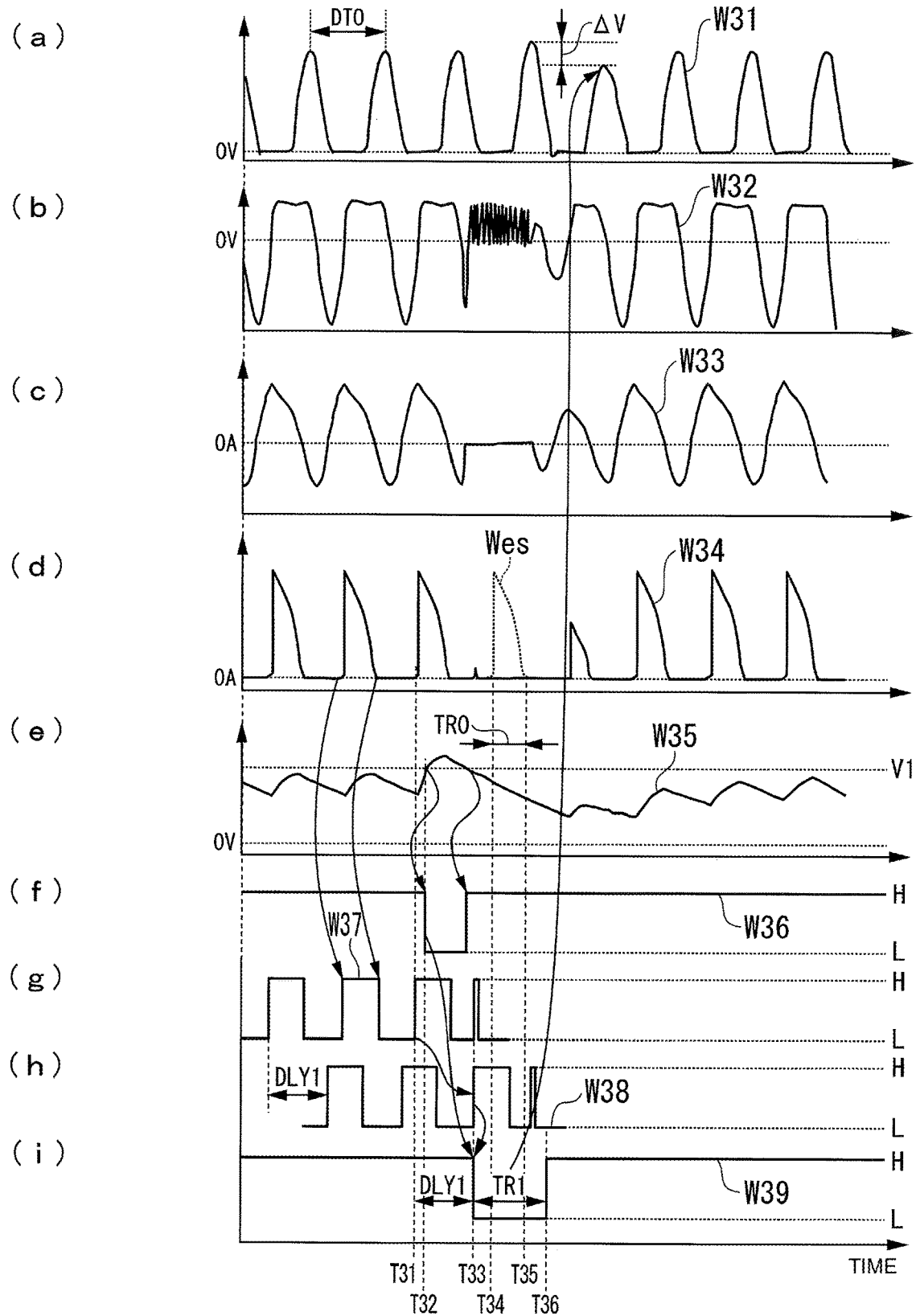
FIG. 14 is a timing chart for illustrating an example of the resonance control processing of the power receiving device according to the fourth embodiment.

FIG. 14 is a timing chart for illustrating an example of the resonance control processing of the power receiving device 2c according to the fourth embodiment.

In FIG. 14, waveforms W31 to W38 represent, in the order from above, (a) a voltage of the feeding coil 11 (voltage of the node N1), (b) a voltage of the receiving coil 21 (voltage of the node N2), (c) a current of the receiving coil 21, (d) a current of the rectifying diode 24, (e) an output voltage (load supply voltage), (f) a voltage of the node N6 (output voltage of the comparator 33), (g) a voltage of the node N7 (output voltage of the comparator 36b), (h) a voltage of the node N8 (output voltage of the delay circuit 38), and (i) a gate voltage of the resonance control transistor 23. In this case, the current (c) of the receiving coil 21 is a current of the receiving coil 21 flowing to the rectifying diode 24. The vertical axis represents a voltage for the waveforms (a), (b), and (e), a current for the waveforms (c) and (d), and a logic state for the waveforms (f) to (i). The horizontal axis represents time.

Further, in FIG. 14, a waveform Wes of the broken line and a period DT0 are the same as those in FIG. 3. Further, the delay time DLY1 represents an output delay time of the delay circuit 38.

Further, the comparator 36b compares the voltages at both ends of the rectifying diode 24. The comparator 36b outputs the H state to the node N7 when the voltage of the anode terminal (node N2) becomes larger than the voltage of the cathode terminal (node N4), and outputs the L state to the node N7 when the voltage of the anode terminal (node N2) is equal to or less than the voltage of the cathode terminal (node N4) (see the waveform W37). The period during which the node N7 is in the H state corresponds to a period including the conducting period of the rectifying diode 24.

Further, when the voltage of the node N6 (see the waveform W35) becomes equal to or more than the voltage V1 at a time T32, the comparator 33 outputs the L state to the node N6. That is, the comparator 33 changes the voltage of the node N6 from the H state to the L state (see the waveform W36).

Meanwhile, when the voltage of the anode terminal of the rectifying diode 24 (node N2) rises to become equal to the voltage of the cathode terminal of the rectifying diode 24 (node N4) at a time T31, the comparator 36b outputs the H state to the node N7. That is, the comparator 36b changes the voltage of the node N7 from the L state to the H state (see the waveform W37).

Next, at a time T33, the delay circuit 38 outputs the H state to the node N8 with a delay of the delay time DLY1 from the above-mentioned time T32. That is, the delay circuit 38 changes the voltage of the node N8 from the L state to the H state (see the waveform W38). The synchronization circuit 35a sets the gate voltage of the resonance control transistor 23 to the L state in synchronization with rise timing of the node N8 from the L state to the H state (see the waveform W39). With this, the resonance control transistor 23 is set to the OFF state, and the resonant circuit 20 is set to the non-resonant state.

Next, the synchronization circuit 35a waits for an elapse of the period TR0 based on the drive cycle DT0. When the voltage of the node N6 is in the H state at a time T36, the synchronization circuit 35a sets the gate voltage of the resonance control transistor 23 to the H state (see the waveform W39). With this, the resonance control transistor 23 is set to the ON state, and the resonant circuit 20 is set to the resonant state again.

The operation from a time T34 to the time T36 is the same as that from the time T4 to the time T6 illustrated in FIG. 3, and hence description thereof is omitted here.

As represented by the waveform W34, in the resonance control processing of the power receiving device 2c according to the fourth embodiment, the waveform Wes is not generated in the current of the rectifying diode 24, and the current of the receiving coil 21 decreases. This decrease in current is transmitted from the receiving coil 21 to the feeding coil 11, and a waveform variation, in which a peak voltage value decreases by the voltage difference ΔV, occurs in the voltage of the feeding coil 11 (voltage of the node N1).

Further, the drive control processing of the power feeding device 1 according to the fourth embodiment is the same as that of the first embodiment illustrated in FIG. 4 and FIG. 5, and hence description thereof is omitted here.

As described above, the power feeding system 100c according to the fourth embodiment includes the power feeding device 1 and the power receiving device 2c. The power receiving device 2c includes the resonant circuit 20, the rectifying diode 24, and the resonance control unit 30c. The resonance control unit 30c is configured to set the resonance control transistor 23 to the OFF state at the timing delayed by the delay time DLY1 from the timing at which the voltage of the anode terminal of the rectifying diode 24 and the voltage of the cathode terminal of the rectifying diode 24 become equal to each other, and set the resonance control transistor 23 to the ON state after an elapse of the predetermined period (for example, after an elapse of the period TR1) after the resonance control transistor 23 is set to the OFF state. For example, the resonance control unit 30c is configured to set the resonance control transistor 23 to the OFF state at the timing delayed by the period (delay time DLY1) shorter than one cycle of the drive signal DRV from the timing at which the voltage of the anode terminal of the rectifying diode 24 becomes equal to or more than the voltage of the cathode terminal of the rectifying diode 24, and set the resonance control transistor 23 to the ON state after an elapse of the predetermined period (for example, after an elapse of the period TR1) after the resonance control transistor 23 is set to the OFF state.

With this, the power feeding system 100c according to the fourth embodiment exhibits the same effects as those of the first embodiment described above, and can reduce the risk of an erroneous determination about whether or not electric power can be supplied to the power receiving device 2c. Further, the power feeding system 100c according to the fourth embodiment can detect the timing at which the voltage of the receiving coil 21 (voltage of the node N2) rises and the voltages at both ends of the receiving coil 21 become equal to each other. That is, the power feeding system 100c according to the fourth embodiment can reduce the risk of an erroneous determination about whether or not electric power can be supplied to the power receiving device 2c with simple means for comparing the voltages at both ends of the rectifying diode 24 to each other.

The present invention is not limited to each embodiment described above, and may be changed within the scope not departing from the gist of the present invention.

For example, in each embodiment described above, description is given of the example in which the predetermined period (period TR1) during which the OFF state of the resonance control transistor 23 is kept is set to correspond to one cycle of the drive signal DRV and include the entire period of the subsequent conducting period (period TR0). However, the present invention is not limited thereto. The predetermined period (period TR1) may be set to be shorter than one cycle of the drive signal DRV and include a part of the subsequent conducting period (period TR0).

Further, in each embodiment described above, as an example in which the resonance control unit 30 (30a to 30c) of the receiving device 2 (2a to 2c) determines whether or not the resonant circuit 20 is to be set to the non-resonant state based on the received power and the power consumption of the load 26, description is given of the example of determining whether or not the resonant circuit 20 is to be set to the non-resonant state based on the voltage of the supply line (voltage of the node N4) through which the received power after rectification is supplied to the load 26. However, the present invention is not limited thereto. For example, the resonance control unit 30 (30a to 30c) may determine whether or not the resonant circuit 20 is to be set to the non-resonant state based on a current flowing to the load 26 instead of the voltage of the supply line (voltage of the node N4), or other procedures may be used.

Further, in each embodiment described above, as an example of the variation detection unit configured to detect a periodic waveform variation in the excited voltage of the feeding coil 11, description is given of the example using the crest value variation detection unit 15 configured to detect the peak voltage of the feeding coil 11. However, the present invention is not limited thereto. For example, the variation detection unit may detect the periodic waveform variation in the excited voltage of the feeding coil 11 as a variation in waveform frequency of the excited voltage or a variation in waveform cycle of the excited voltage.

Each configuration included in the power feeding system 100 (100a to 100c) may be implemented by dedicated hardware. Each configuration included in the power feeding system 100 (100a to 100c) may be constructed by a memory and a CPU, and its functions may be implemented by loading a program for implementing each configuration included in the power feeding system 100 (100a to 100c) onto the memory and executing the program.

What is claimed is:

1. A power feeding system, comprising:
a power feeding device including a feeding coil; and
a power receiving device including a receiving coil,
the power feeding system being configured to supply electric power from the power feeding device to the power receiving device through electromagnetic induction,
the power receiving device comprising:
a resonant circuit having:
the receiving coil configured to receive the electric power from the feeding coil;
a resonant capacitor configured to resonate with the receiving coil; and
a first switching element configured to control a resonant state by changing an electrical connection state of the resonant capacitor;
a rectifying diode configured to rectify received power, which is received by the receiving coil from the feeding coil, into DC power to supply the DC power to a load; and
a resonance control unit configured to control the first switching element to a non-conductive state, based on the received power and power consumption of the load to which the received power is supplied, to set the resonant circuit to a non-resonant state, during a period including a subsequent conducting period from a beginning during which a current flows to the rectifying diode, and which is estimated in a resonant state of the resonant circuit,
the power feeding device comprising:
a second switching element connected in series to the feeding coil, and periodically switched between a conductive state and a non-conductive state with a drive signal for driving the feeding coil; and
a drive control unit configured to determine whether or not the electric power is allowed to be supplied to the power receiving device based on a periodic waveform variation in an excited voltage excited in the feeding coil, the periodic waveform variation being detected based on a change in electrical connection state of the resonant capacitor, and configured to control the second switching element through continual supply or no supply of the drive signal based on a result of the determination.

2. A power feeding system according to claim 1, wherein the resonance control unit is configured to set the first switching element to the non-conductive state in synchronization with timing at which a voltage of the receiving coil becomes equal to or less than a predetermined voltage value, and to set the first switching element to a conductive state after an elapse of a predetermined period after the first switching element is set to the non-conductive state.

3. A power feeding system according to claim 2, wherein the predetermined period is determined based on one cycle of the drive signal.

4. A power feeding system according to claim 1, wherein the resonance control unit is configured to set the first switching element to the non-conductive state in synchronization with a period during which a current of the receiving coil flowing to the rectifying diode becomes equal to or less than a predetermined current value, and to set the first switching element to a conductive state after an elapse of a predetermined period after the first switching element is set to the non-conductive state.

5. A power feeding system according to claim 4, wherein the resonance control unit is configured to set the first switching element to the non-conductive state in synchronization with timing at which the current of the receiving coil flowing to the rectifying diode reaches a minimum value, and to set the first switching element to the conductive state after an elapse of the predetermined period after the first switching element is set to the non-conductive state.

6. A power feeding system according to claim 4, wherein the predetermined period is determined based on one cycle of the drive signal.

7. A power feeding system according to claim 1, wherein the resonance control unit is configured to set the first switching element to the non-conductive state in synchronization with timing at which a voltage of an anode terminal of the rectifying diode and a voltage of a cathode terminal of the rectifying diode become equal to each other, and to set the first switching element to a conductive state after an elapse of a predetermined period after the first switching element is set to the non-conductive state.

8. A power feeding system according to claim 7, wherein the resonance control unit is configured to set the first switching element to the non-conductive state in synchronization with timing at which the voltage of the anode terminal of the rectifying diode becomes equal to or less than the voltage of the cathode terminal of the rectifying diode, and to set the first switching element to the conductive state after an elapse of the predetermined period after the first switching element is set to the non-conductive state.

9. A power feeding system according to claim 7, wherein the resonance control unit is configured to set the first switching element to the non-conductive state at timing delayed by a period shorter than one cycle of the drive signal from timing at which the voltage of the anode terminal of the rectifying diode becomes equal to or more than the voltage of the cathode terminal of the rectifying diode, and to set the first switching element to the conductive state after an elapse of the predetermined period after the first switching element is set to the non-conductive state.

10. A power feeding system according to claim 7, wherein the predetermined period is determined based on one cycle of the drive signal.

11. A power feeding system according to claim 1, wherein the resonance control unit comprises:
- a resonance determination unit configured to determine whether or not the resonant circuit is to be set to the non-resonant state based on the received power and the power consumption of the load to which the received power is supplied; and
- a signal generation unit configured to generate a control signal for controlling the first switching element to the non-conductive state when the resonance determination unit determines that the resonant circuit is to be set to the non-resonant state.

12. A power feeding system according to claim 1, wherein the resonance control unit is configured to control the first switching element to the non-conductive state to set the resonant circuit to the non-resonant state during a period including an entire period of the estimated subsequent conducting period.

13. A power receiving device configured to receive electric power from a power feeding device having a feeding coil through electromagnetic induction,
the power receiving device comprising:
- a resonant circuit including:
  - a receiving coil configured to receive the electric power from the feeding coil;
  - a resonant capacitor configured to resonate with the receiving coil; and
  - a first switching element configured to control a resonant state by changing an electrical connection state of the resonant capacitor;
- a rectifying diode configured to rectify received power received by the receiving coil from the feeding coil into DC power to supply the DC power to a load; and
- a resonance control unit configured to control the first switching element to a non-conductive state, based on the received power and power consumption of the load to which the received power is supplied, to set the resonant circuit is to a non-resonant state, during a period including a subsequent conducting period from a beginning during which a current flows to the rectifying diode, and which is estimated in a resonant state of the resonant circuit.

14. A power feeding method for a power feeding system configured to supply electric power from the power feeding device to the power receiving device through electromagnetic induction,
the power receiving device comprising:
- a resonant circuit including:
  - a receiving coil configured to receive the electric power from a feeding coil;
  - a resonant capacitor configured to resonate with the receiving coil; and
  - a first switching element configured to perform switching between a resonant state and a non-resonant state by changing an electrical connection state of the resonant capacitor; and
- a rectifying diode configured to rectify received power by the receiving coil from the feeding coil, into DC power to supply the DC power to a load, the power feeding device comprising the feeding coil, and a second switching element connected in series to the feeding coil,
the power feeding method comprising:
- generating a drive signal by the power feeding device to supply the second switching element with the drive signal for driving the feeding coil by periodically switching the second switching element between a conductive state and a non-conductive state;
- setting the first switching element to the non-conductive state by the power receiving device to set the resonant circuit to the non-resonant state by controlling the first switching element, based on the received power and power consumption of the load to which the received power is supplied, during a period including a subsequent conducting period from a beginning during which a current flows to the rectifying diode, and which is estimated in the resonant state of the resonant circuit; and
- determining, by the power feeding device, whether or not a supply of the electric power is allowed to the power receiving device based on a periodic waveform variation in an excited voltage excited in the feeding coil, the periodic waveform variation being detected based on a change in electrical connection state of the resonant capacitor, and controlling the second switching element through continual supply or no supply of the drive signal based on a result of the determination.

* * * * *